(12) United States Patent
Miyabe et al.

(10) Patent No.: US 7,668,428 B2
(45) Date of Patent: Feb. 23, 2010

(54) OPTICAL FIBER AND OPTICAL DEVICE

(75) Inventors: Ryo Miyabe, Tokyo (JP); Kazunori Mukasa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/406,483

(22) Filed: Mar. 18, 2009

(65) Prior Publication Data
US 2009/0274427 A1 Nov. 5, 2009

Related U.S. Application Data

(63) Continuation of application No. PCT/JP2008/065770, filed on Sep. 2, 2008.

(30) Foreign Application Priority Data
Apr. 30, 2008 (JP) .............................. 2008-119078

(51) Int. Cl.
G02B 6/032 (2006.01)
(52) U.S. Cl. ....................................... 385/125
(58) Field of Classification Search .................. 385/125
See application file for complete search history.

(56) References Cited

U.S. PATENT DOCUMENTS

| 7,502,540 | B2 | 3/2009 | Miyabe et al. | |
|---|---|---|---|---|
| 7,529,453 | B2 | 5/2009 | Miyabe et al. | |
| 2002/0005969 | A1* | 1/2002 | Ranka et al. | 359/161 |
| 2002/0061176 | A1* | 5/2002 | Libori et al. | 385/125 |
| 2005/0069269 | A1* | 3/2005 | Libori et al. | 385/125 |
| 2006/0213230 | A1 | 9/2006 | Miyabe et al. | |
| 2008/0292251 | A1 | 11/2008 | Miyabe et al. | |
| 2008/0298759 | A1 | 12/2008 | Miyabe et al. | |
| 2009/0052854 | A1 | 2/2009 | Miyabe et al. | |
| 2009/0052855 | A1 | 2/2009 | Miyabe et al. | |

FOREIGN PATENT DOCUMENTS

JP 2001-220164 8/2001

(Continued)

OTHER PUBLICATIONS

Yamamoto Tetsuya et al., "Nonlinear characteristics of the photonic crystal fibers", Proceedings of the Society Conference of IEICE, No. 1, Sep. 7, 2005, pp. S-17, S-18, p. 1.

(Continued)

*Primary Examiner*—Uyen-Chau N Le
*Assistant Examiner*—Hoang Tran
(74) *Attorney, Agent, or Firm*—Oblon, Spivak, McClelland, Maier & Neustadt, L.L.P.

(57) ABSTRACT

An optical fiber includes a core region and a cladding region formed on an outer circumference of the core region. The cladding region includes a plurality of holes arranged around the core region and has a refractive index lower than a refractive index of the core region. A zero dispersion wavelength of the optical fiber is shorter than 1150 nanometers. The optical fiber propagates a light having a wavelength longer than 1000 nanometers exclusively in a fundamental mode of $LP_{01}$ mode. An effective core area of the optical fiber is equal to or smaller than 12.0 $\mu m^2$ at a wavelength of 1064 nanometers.

19 Claims, 20 Drawing Sheets

FOREIGN PATENT DOCUMENTS

| | | |
|---|---|---|
| JP | 2002-326831 | 11/2002 |
| WO | WO 2008/062834 A1 | 5/2008 |

OTHER PUBLICATIONS

O. Tohyama et al., "Photonic Crystal Fibers(3)—Application to Supercontinuum Light Sources", 102, Oct. 2005, pp. 33-36.

T. A. Birks et al., "Dispersion Compensation Using Single-Material Fibers", IEEE Photonics Technology Letters, vol. 11, No. 6, Jun. 1999, pp. 674-676.

J.C. Knight et al., "Anomalous Dispersion in Photonic Crystal Fiber", IEEE Photonics Technology Letters, vol. 12, No. 7, Jul. 2000, pp. 807-809.

P. J. Bennett et al., "Toward practical holey fiber technology: fabrication, splicing, modeling, and characterization", Optics Letters, Sep. 1, 1999, vol. 24, No. 17, pp. 1203-1205.

Takemi Hasegawa et al., "Novel hole-assisted lightguide fiber exhibiting large anomalous dispersion and low loss below 1 dB/km", Optical Fiber Communication Conference, Mar. 22, 2001, pp. D5-1 to D5-3.

* cited by examiner

|  | Δ1 | HOLE DIAMETER |
|---|---|---|
|  | % | μm |
| CALCULATION EXAMPLE 1 | 1.0 | 1.0 |
| CALCULATION EXAMPLE 2 | 1.0 | 2.0 |
| CALCULATION EXAMPLE 3 | 2.0 | 1.0 |
| CALCULATION EXAMPLE 4 | 2.0 | 2.0 |
| CALCULATION EXAMPLE 5 | 3.0 | 1.0 |
| CALCULATION EXAMPLE 6 | 3.0 | 2.0 |

| | HOLE DIAMETER | DISTANCE L | ZERO DISPERSION WAVELENGTH | EFFECTIVE CORE AREA |
|---|---|---|---|---|
| | μm | μm | nm | μm² |
| CALCULATION EXAMPLE 7 | 1.0 | 0.1 | 849-1105 | 2.62-11.67 |
| CALCULATION EXAMPLE 8 | 1.0 | 0.3 | 911-1128 | 3.15-12 |
| CALCULATION EXAMPLE 9 | 1.0 | 0.5 | 979-1150 | 3.56-12 |
| CALCULATION EXAMPLE 10 | 1.0 | 0.7 | 1062-1150 | 3.86-12 |
| CALCULATION EXAMPLE 11 | 1.0 | 0.9 | 1140-1150 | 4.8-12 |
| CALCULATION EXAMPLE 12 | 1.0 | 1.2 | > 1150 | -- |

| | CORE DIAMETER μm | HOLE DIAMETER μm |
|---|---|---|
| CALCULATION EXAMPLE 13 | 3.0 | 1.0 |
| CALCULATION EXAMPLE 14 | 3.0 | 2.0 |
| CALCULATION EXAMPLE 15 | 3.0 | 2.5 |
| CALCULATION EXAMPLE 16 | 3.0 | 3.0 |

| | CORE DIAMETER | HOLE DIAMETER | DISTANCE L | UPPER-LIMIT VALUE OF RELATIVE REFRACTIVE INDEX DIFFERENCE $\Delta 1$ |
|---|---|---|---|---|
| | $\mu m$ | $\mu m$ | $\mu m$ | % |
| CALCULATION EXAMPLE 17 | 4.0 | 3.0 | 1.1 | 0.8 |
| CALCULATION EXAMPLE 18 | 4.0 | 3.0 | 0.9 | 0.8 |
| CALCULATION EXAMPLE 19 | 4.0 | 3.0 | 0.7 | 0.6 |
| CALCULATION EXAMPLE 20 | 4.0 | 3.0 | 0.5 | 0.4 |
| CALCULATION EXAMPLE 21 | 4.5 | 3.0 | 0.3 | < 0 |
| CALCULATION EXAMPLE 22 | 4.5 | 3.0 | 0.1 | < 0 |
| CALCULATION EXAMPLE 23 | 4.5 | 3.0 | 0.9 | 0.8 |
| CALCULATION EXAMPLE 24 | 4.5 | 3.0 | 0.7 | 0.8 |
| CALCULATION EXAMPLE 25 | 4.5 | 3.0 | 0.5 | 0.7 |

| | CORE DIAMETER | HOLE DIAMETER | RELATIVE REFRACTIVE INDEX DIFFERENCE Δ1 |
|---|---|---|---|
| | μm | μm | % |
| CALCULATION EXAMPLE 26 | 2.0 | 1.3 | 1.0 |
| CALCULATION EXAMPLE 27 | 2.0 | 1.3 | 1.5 |
| CALCULATION EXAMPLE 28 | 2.0 | 1.3 | 2.0 |
| CALCULATION EXAMPLE 29 | 2.0 | 1.3 | 2.5 |
| CALCULATION EXAMPLE 30 | 2.0 | 1.3 | 3.0 |

FIG.11

|  | CORE DIAMETER | HOLE DIAMETER | RELATIVE REFRACTIVE INDEX DIFFERENCE Δ1 |
|---|---|---|---|
|  | μm | μm | % |
| CALCULATION EXAMPLE 31 | 2.5 | 1.5 | 1.0 |
| CALCULATION EXAMPLE 32 | 2.5 | 1.5 | 1.5 |
| CALCULATION EXAMPLE 33 | 2.5 | 1.5 | 2.0 |
| CALCULATION EXAMPLE 34 | 2.5 | 1.5 | 2.5 |
| CALCULATION EXAMPLE 35 | 2.5 | 1.5 | 3.0 |
| CALCULATION EXAMPLE 36 | 3.0 | 2.0 | 1.0 |
| CALCULATION EXAMPLE 37 | 3.0 | 2.0 | 1.5 |
| CALCULATION EXAMPLE 38 | 3.0 | 2.0 | 2.0 |
| CALCULATION EXAMPLE 39 | 3.0 | 2.0 | 2.5 |
| CALCULATION EXAMPLE 40 | 3.0 | 2.0 | 3.0 |
| CALCULATION EXAMPLE 41 | 3.5 | 2.5 | 1.0 |
| CALCULATION EXAMPLE 42 | 3.5 | 2.5 | 1.5 |
| CALCULATION EXAMPLE 43 | 3.5 | 2.5 | 2.0 |
| CALCULATION EXAMPLE 44 | 3.5 | 2.5 | 2.5 |
| CALCULATION EXAMPLE 45 | 3.5 | 2.5 | 3.0 |
| CALCULATION EXAMPLE 46 | 4.0 | 2.5 | 1.0 |
| CALCULATION EXAMPLE 47 | 4.0 | 2.5 | 1.5 |
| CALCULATION EXAMPLE 48 | 4.0 | 2.5 | 2.0 |
| CALCULATION EXAMPLE 49 | 4.0 | 2.5 | 2.5 |
| CALCULATION EXAMPLE 50 | 4.0 | 2.5 | 3.0 |

FIG.16

| | CORE DIAMETER | HOLE DIAMETER | DISTANCE L | RANGE OF Δ1 | EFFECTIVE CORE AREA | ZERO DISPERSION WAVELENGTH |
|---|---|---|---|---|---|---|
| | μm | μm | μm | % | μm² | nm |
| CALCULATION EXAMPLE 51 | 2.5 | 1.5 | 0.1 | 1.5-3.0 | 3.72-3.88 | 899-938 |
| CALCULATION EXAMPLE 52 | 2.5 | 1.5 | 0.3 | 1.4-3.0 | 4.28-4.74 | 950-1004 |
| CALCULATION EXAMPLE 53 | 2.5 | 1.5 | 0.5 | 1.3-3.0 | 4.67-5.66 | 1000-1075 |
| CALCULATION EXAMPLE 54 | 2.5 | 1.5 | 0.7 | 1.2-2.8 | 5.57-6.38 | 1047-1150 |
| CALCULATION EXAMPLE 55 | 2.5 | 1.5 | 0.9 | 1.2-1.7 | 6.27-7.05 | 1102-1150 |

FIG.18

| | CORE DIAMETER | HOLE DIAMETER | DISTANCE L | RANGE OF Δ1 | EFFECTIVE CORE AREA | ZERO DISPERSION WAVELENGTH |
|---|---|---|---|---|---|---|
| | μm | μm | μm | % | μm² | nm |
| CALCULATION EXAMPLE 56 | 3.0 | 1.0 | 0.1 | 1.2-2.5 | 5.3-5.74 | 991-1016 |
| CALCULATION EXAMPLE 57 | 3.0 | 1.0 | 0.3 | 1.1-2.3 | 6-6.75 | 1034-1061 |
| CALCULATION EXAMPLE 58 | 3.0 | 1.0 | 0.5 | 1.0-2.1 | 6.59-7.76 | 1082-1110 |
| CALCULATION EXAMPLE 59 | 3.0 | 1.0 | 0.7 | 1.0-1.6 | 7.5-8.55 | 1138-1150 |

FIG.20

| | CORE DIAMETER | HOLE DIAMETER | DISTANCE L | RANGE OF Δ1 | EFFECTIVE CORE AREA | ZERO DISPERSION WAVELENGTH |
|---|---|---|---|---|---|---|
| | μm | μm | μm | % | μm² | nm |
| CALCULATION EXAMPLE 60 | 3.5 | 1.0 | 0.1 | 1.0-1.9 | 7.07-7.58 | 1039-1049 |
| CALCULATION EXAMPLE 61 | 3.5 | 1.0 | 0.3 | 1.0-1.7 | 7.96-8.63 | 1073-1085 |
| CALCULATION EXAMPLE 62 | 3.5 | 1.0 | 0.5 | 1.0-1.5 | 8.78-9.54 | 1108-1120 |
| CALCULATION EXAMPLE 63 | 3.5 | 1.0 | 0.7 | 1.0-1.2 | 9.83-10.3 | 1143-1150 |

FIG.26

| | CORE DIAMETER | HOLE DIAMETER | DISTANCE L | CUTOFF WAVELENGTH | EFFECTIVE CORE AREA | ZERO DISPERSION WAVELENGTH |
|---|---|---|---|---|---|---|
| | μm | μm | μm | nm | μm² | nm |
| CALCULATION EXAMPLE 64 | 3.1 | 1.0 | 0.3 | 965 | 6.44 | 1069 |
| CALCULATION EXAMPLE 65 | 3.2 | 1.0 | 0.25 | 985 | 6.61 | 1065 |
| CALCULATION EXAMPLE 66 | 3.3 | 1.0 | 0.2 | 1000 | 6.77 | 1062 |
| CALCULATION EXAMPLE 67 | 3.1 | 1.1 | 0.3 | 960 | 6.38 | 1055 |
| CALCULATION EXAMPLE 68 | 3.2 | 1.1 | 0.25 | 980 | 6.54 | 1052 |
| CALCULATION EXAMPLE 69 | 3.3 | 1.1 | 0.2 | 1000 | 6.7 | 1049 |
| CALCULATION EXAMPLE 70 | 3.1 | 1.25 | 0.3 | 960 | 6.33 | 1046 |
| CALCULATION EXAMPLE 71 | 3.2 | 1.25 | 0.25 | 980 | 6.49 | 1042 |
| CALCULATION EXAMPLE 72 | 3.3 | 1.25 | 0.2 | 990 | 6.64 | 1040 |
| CALCULATION EXAMPLE 73 | 3 | 1.0 | 0.43 | 960 | 6.48 | 1094 |
| CALCULATION EXAMPLE 74 | 3.1 | 1.0 | 0.38 | 980 | 6.65 | 1088 |
| CALCULATION EXAMPLE 75 | 3.2 | 1.0 | 0.33 | 1000 | 6.83 | 1083 |

FIG.28

| | CORE DIAMETER | HOLE DIAMETER | DISTANCE L | CUTOFF WAVELENGTH | EFFECTIVE CORE AREA | ZERO DISPERSION WAVELENGTH |
|---|---|---|---|---|---|---|
| | μm | μm | μm | nm | μm² | nm |
| CALCULATION EXAMPLE 76 | 2.88 | 1.63 | 0.19 | 830 | 4.86 | 983 |
| CALCULATION EXAMPLE 77 | 3.07 | 1.74 | 0.205 | 900 | 5.38 | 1004 |
| CALCULATION EXAMPLE 78 | 3.26 | 1.85 | 0.22 | 950 | 5.9 | 1025 |

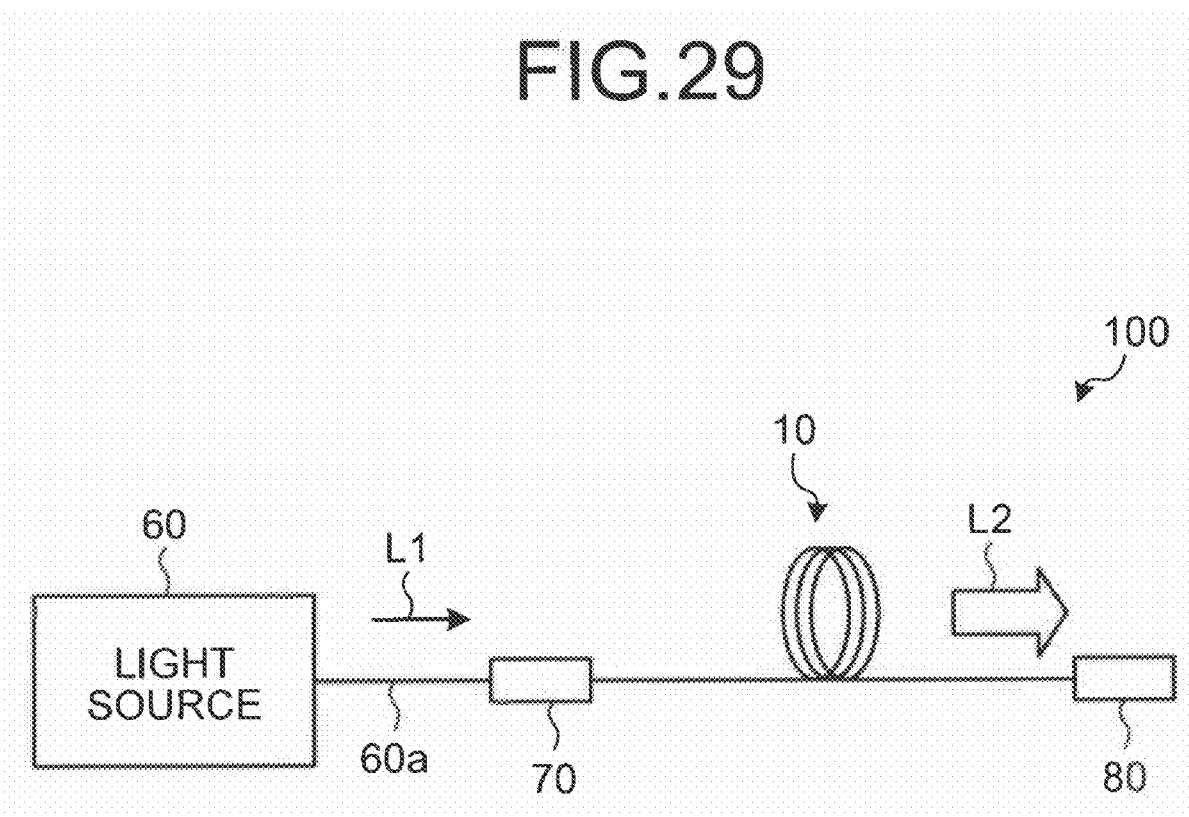

OPTICAL FIBER AND OPTICAL DEVICE

CROSS-REFERENCE TO RELATED APPLICATIONS

This application is a continuation of PCT international application Ser. No. PCT/JP2008/065770 filed Sep. 2, 2008 which designates the United States, incorporated herein by reference, and which claims the benefit of priority from Japanese Patent Application No. 2008-119078, filed Apr. 30, 2008, incorporated herein by reference.

BACKGROUND OF THE INVENTION

1. Field of the Invention

The present invention relates to an optical fiber and an optical device employing the optical fiber.

2. Description of the Related Art

In recent years, a laser light source that outputs a high-power laser light having a wavelength near 1000 nanometers has been matured, which includes yttrium aluminum garget (YAG) laser having an oscillation wavelength of 1064 nanometers and an optical fiber laser using a ytterbium-doped optical fiber (YDF) having an oscillation wavelength of 1100 nanometers. With the development of such a laser light source, a nonlinear optical device is getting an attention, such as a supercontinuum light generation device using the laser light source as a pumping light source. An optical fiber used in such a nonlinear optical device is required to have the zero dispersion wavelength near the wavelength of the pumping light with high optical nonlinearity.

In the case of a generally-used single-mode optical fiber, which is made of silica-based glass, the wavelength dispersion characteristic is represented by a sum of the structure dispersion and the material dispersion. The structure dispersion is a wavelength dispersion determined by the refractive index profile of the optical fiber, and the material dispersion is a wavelength dispersion determined by the optical characteristics of the silica-based glass that is the main constituent material of the optical fiber. Because the characteristic of the structure dispersion can be largely changed by changing the refractive index profile of the optical fiber, it is possible to set the zero dispersion wavelength at which the wavelength dispersion becomes zero to a desired wavelength by adjusting the structure dispersion of the optical fiber.

Nevertheless, the wavelength where the zero dispersion wavelength can be easily set by adjusting the structure dispersion is equal to or longer than 1200 nanometers, and it is difficult to set the zero dispersion wavelength to a wavelength shorter than 1200 nanometers. The reason is as follows. The material dispersion of the silica-based glass has a positive value at a wavelength side longer than a wavelength of about 1300 nanometers, showing an anomalous dispersion. However, it becomes negative at a wavelength of about 1300 nanometers, showing a larger normal dispersion as the wavelength becomes shorter at a region of a short wavelength side. On the other hand, the structure dispersion is basically a normal dispersion at a wavelength side longer than about 1000 nanometers, and even if the structure dispersion is shifted to the anomalous dispersion side by changing the refractive index profile, the absolute value of the dispersion is small. For this reason, the wavelength dispersion of the optical fiber, which is the sum of the material dispersion and the structure dispersion, becomes negative. As a result, it is difficult to set the zero dispersion wavelength to a wavelength shorter than 1200 nanometers.

Meanwhile, an optical fiber commonly known as a photonic crystal fiber has been reported, which has a large number of holes around the core region made of silica glass. Regarding the photonic crystal fiber, there are reports saying that the structure dispersion with a larger absolute value can be obtained (see T. A. Birks, et al., "Dispersion compensation using single-material fibers", Photon. Tech. Lett., 11, p 674 (1999) and J. C. Knight, et al., "Anomalous dispersion in photonic crystal fiber", Photon. Tech. Lett., 12, p 807 (2000)). In addition, another report says that a single-mode operation and the zero dispersion wavelength characteristic can be obtained at any wavelength by using the structure obtained by forming such holes in the photonic crystal fiber (see P. J. Bennett, et al., "Toward practical holey fiber technology: fabrication, splicing, modeling, and characterization", Opt. Lett., 24 p 1203 (1999)). In the photonic crystal fiber, the refractive index profile of the optical fiber can be largely changed by arranging as large number of holes as 60 to 300 in the cladding region, which makes it possible to obtain the structure dispersion with a large absolute value. With this mechanism, for example, a large anomalous dispersion can be obtained at a short wavelength region of the near infrared, and therefore the wavelength dispersion can be made zero by combining with the material dispersion having a large normal dispersion. In the photonic crystal fiber, the wavelength dispersion characteristic largely depends on the size of the holes and the accuracy of arranging the holes. However, because it is difficult to fabricate the optical fiber in which such a larger number of holes are accurately arranged, the manufacturing yield becomes decreased resulting in an increase of cost. Furthermore, in the photonic crystal fiber, a dopant for increasing the refractive index, such as germanium, is not doped in the core region, and the effective refractive index of the core region is low, which easily causes a large optical leakage loss. Because a large number of hole layers are necessary to suppress the leakage loss, the total number of holes cannot be reduced, which causes a further decrease of the manufacturing yield and a further increase of cost.

On the other hand, an optical fiber in which a number of holes are arranged around a core region doped with the germanium has been reported, which is called the hole-assisted fiber (see T. Hasegawa, et al., "Novel hole-assisted lightguide fiber exhibiting large anomalous dispersion and low loss below 1 dB/km", OFC 2001, D5-1 (2001)). The features of the hole-assisted fiber are: it is possible to reduce the macrobending loss because a strong optical confinement in the core region can be obtained by providing the holes; and the structure dispersion can be largely changed by providing the holes near the core region. In addition, unlike the photonic crystal fiber, because the hole-assisted fiber includes a core region having a refractive index higher than that of a cladding region, the effective refractive index of the core region is higher than the refractive index of the cladding region, which makes it possible to easily suppress the optical leakage loss even without providing a large number of hole layers.

However, regarding a single-mode optical fiber that has the zero dispersion wavelength at a wavelength near 1000 nanometers and is particularly suitable for a nonlinear optical device in this wavelength band, the photonic crystal fiber is not a good candidate because it is difficult to fabricate the fiber, which increases the cost. Furthermore, in the case of the hole-assisted fiber, the shift of the zero dispersion wavelength to a wavelength near 1000 nanometers by controlling the structure dispersion increases the optical confinement, which leads the light to easily propagate in a higher-order mode, and therefore a single-mode operation at the zero dispersion wavelength becomes hard to obtain.

SUMMARY OF THE INVENTION

It is an object of the present invention to at least partially solve the problems in the conventional technology.

According to one aspect of the present invention, there is provided an optical fiber including a core region through which a light propagates and a cladding region formed on an outer circumference of the core region. The cladding region includes a plurality of holes arranged around the core region and has a refractive index lower than a refractive index of the core region. A zero dispersion wavelength of the optical fiber is shorter than 1150 nanometers. The optical fiber propagates a light having a wavelength longer than 1000 nanometers exclusively in a fundamental mode of $LP_{01}$ mode. An effective core area of the optical fiber is equal to or smaller than 12.0 μm² at a wavelength of 1064 nanometers.

Furthermore, according to another aspect of the present invention, there is provided an optical device including a light source that outputs a light; an optical input unit that receives the light from the light source; an optical fiber that causes a nonlinear optical phenomenon to occur by the light from the optical input unit; and an optical output unit that outputs a light generated by the nonlinear optical phenomenon in the optical fiber. The optical fiber includes a core region through which a light propagates and a cladding region formed on an outer circumference of the core region. The cladding region including a plurality of holes arranged around the core region and has a refractive index lower than a refractive index of the core region. A zero dispersion wavelength of the optical fiber is shorter than 1150 nanometers. The optical fiber propagates a light having a wavelength longer than 1000 nanometers exclusively in a fundamental mode of $LP_{01}$ mode. An effective core area of the optical fiber is equal to or smaller than 12.0 μm² at a wavelength of 1064 nanometers.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a table showing setting values of the core diameter, the hole diameter, and the relative refractive index difference Δ1 for optical fibers according to calculation examples 31 to 50;

FIG. 16 is a table showing setting values of the core diameter, the hole diameter, the distance L, and the relative refractive index difference Δ1 and calculated values of the effective core area and the zero dispersion wavelength for optical fibers according to calculation examples 51 to 55;

FIG. 18 is a table showing setting values of the core diameter, the hole diameter, the distance L, and the relative refractive index difference Δ1 and calculated values of the effective core area and the zero dispersion wavelength for optical fibers according to calculation examples 56 to 59;

FIG. 20 is a table showing setting values of the core diameter, the hole diameter, the distance L, and the relative refractive index difference Δ1 and calculated values of the effective core area and the zero dispersion wavelength for optical fibers according to calculation examples 60 to 63;

FIG. 26 is a table showing setting values of the core diameter, the hole diameter, and the distance L, and calculated values of the cutoff wavelength, the effective core area, and the zero dispersion wavelength for optical fibers according to calculation examples 64 to 75;

FIG. 28 is a table showing setting values of the core diameter, the hole diameter, and the distance L, and calculated values of the cutoff wavelength, the effective core area, and the zero dispersion wavelength for optical fibers according to calculation examples 76 to 78; and FIG. 29 is a schematic block diagram of an optical device according to a sixth embodiment of the present invention.

DETAILED DESCRIPTION OF THE PREFERRED EMBODIMENTS

Exemplary embodiments of an optical fiber and an optical device according to the present invention will be explained in detail below with reference to the accompanying drawings. However, the present invention is not to be considered limited to the embodiments. In the specification, the cutoff wavelength ($\lambda c$) is the fiber cutoff wavelength defined in the ITU-T (International Telecommunication Union Telecommunication Standardization Sector) G. 650. 1. Namely, a light having a wavelength longer than the cutoff wavelength of an optical fiber propagates through the optical fiber in the fundamental mode of $LP_{01}$ mode only. Other terminologies not specifically defined in this specification comply with the definitions and the measurement methods in the ITU-T G. 650. 1.

Figures 1, 2:
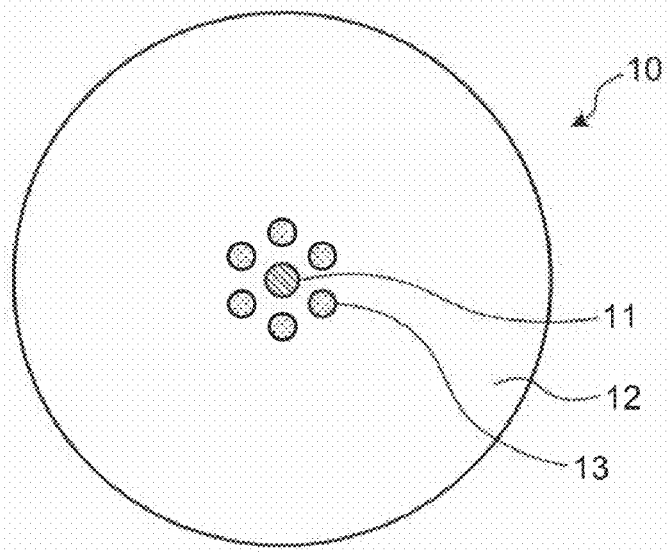
FIG. 1 is a schematic cross section of an optical fiber according to a first embodiment of the present invention.
FIG. 2 is a table showing setting values of the relative refractive index difference Δ1 and the core diameter for optical fibers according to calculation examples 1 to 6.

FIG. 1 is a schematic cross section of an optical fiber 10 according to a first embodiment of the present invention. As shown in FIG. 1, the optical fiber 10 includes a core region 11 and a cladding region 12 formed on the outer circumference of the core region 11.

The core region 11 is made of germanium-doped silica glass. The cladding region 12 is made of pure silica glass that substantially does not contain a dopant for adjusting the refractive index and has a refractive index lower than a refractive index of the core region 11. A relative refractive index difference $\Delta 1$ of the core region 11 with respect to the cladding region 12 is, for example, 2.1%. The relative refractive index difference $\Delta 1$ is defined by Equation (1), where ncore is the maximum refractive index of the core region 11 and nclad is the refractive index of the cladding region 12.

$$\Delta 1 = \{(n\text{core} - n\text{clad})/n\text{core}\} \times 100 \ (\%) \quad (1)$$

The diameter of the core region 11 (core diameter) is, for example, 3.27 micrometers, and the diameter of the cladding region 12 (cladding diameter) is 80 micrometers. The core diameter of the core region 11 is defined as a diameter at a position having relative refractive index difference of a half of $\Delta 1$ in the boundary area between the core region 11 and the cladding region 12.

The cladding region 12 has six holes 13 arranged around the core region 11. The cross section of each of the holes 13 is circular, two adjacent holes makes an angle of 60 degrees with the center of the core region 11, and each of the holes is arranged at a constant distance from the center of the core region 11, such that the holes 13 are arranged to make a six-fold rotational symmetry centering around the core region 11. The diameter of each of the holes 13 (hole diameter) is, for example, 1.8 micrometers, and a distance L between the core region 11 and each of the holes 13 is, for example, 0.265 micrometer. The distance L between the core region 11 and each of the holes 13 is defined as the shortest distance connecting the outer edge of the core region 11 defined by the core diameter and the inner edge of each of the holes 13.

By setting the number of the holes 13 to six, as described above, an enough shift amount of the structure dispersion can be obtained while maintaining a sufficient amount of the distance L between the core region 11 and each of the holes 13, and at the same time, the effective core area can be sufficiently suppressed.

By taking the above-described structure, the optical fiber 10 can achieve the zero dispersion wavelength of about 1040 nanometers, the cutoff wavelength of 990 nanometers, and the effective core area at the wavelength of 1064 nanometers of 6.4 $\mu m^2$. Namely, the optical fiber 10 makes a single-mode optical fiber that realizes the characteristics that the zero dispersion wavelength is shorter than 1150 nanometers, it propagates a light having a wavelength longer than 1000 nanometers including the zero dispersion wavelength in the fundamental mode of $LP_{01}$ mode only, and the effective core area at the wavelength of 1064 nanometers is equal to or smaller than 12.0 $\mu m^2$, which is suitable for a nonlinear optical device used in a wavelength band near 1000 nanometers.

For example, the zero dispersion wavelength shorter than 1150 nanometers makes it possible to decrease the absolute value of the wavelength dispersion in the wavelength band near 1000 nanometers, and therefore, it is possible to obtain the absolute value of the wavelength dispersion at the wavelength of 1064 nanometers equal to or less than 20 ps/nm/km. In addition, with the effective core area at the wavelength of 1064 nanometers equal to or smaller than 12.0 $dm^2$, a large nonlinear effect can be expected at the wavelength of 1064 nanometers having the nonlinear coefficient equal to or larger than 13/W/km.

Furthermore, in the optical fiber 10, a difference between the maximum propagation loss and the minimum propagation loss in a wavelength range of plus minus 200 nanometers with the zero dispersion wavelength as the center wavelength is equal to or lower than 20 dB/km, which means that there is virtually no leakage loss in this wavelength range.

As described above, in the case of the silica-glass-based optical fiber, the material dispersion shows the normal dispersion in the wavelength side shorter than the wavelength of about 1300 nanometers, and its absolute value increases as the wavelength becomes short. For example, the value of the material dispersion is about −15 ps/nm/km at the wavelength of 1150 nanometers, about −22 ps/nm/km at the wavelength of 1100 nanometers, and about −30 ps/nm/km at the wavelength of 1050 nanometers. On the other hand, the structure dispersion shows the anomalous dispersion with a value equal to or less than 10 ps/nm/km in the wavelength side longer than 1000 nanometers; however, in the typical optical fiber made of the silica-based glass, even if the refractive index profile obtained by the structure of the core region and the cladding region is changed, the shift amount of the structure dispersion near the wavelength of 1000 nanometers is small. Therefore, at a wavelength near 1000 nanometers, the wavelength dispersion obtained by combining the material dispersion and the structure dispersion will have a large negative value, which cannot be zero.

On the other hand, in the optical fiber 10 according to the first embodiment, the value of the structure dispersion is largely shifted to the anomalous dispersion side by changing the refractive index profile in an extremely large amount with the formation of the holes 13 in the cladding region 12, to cancel the material dispersion, so that the zero dispersion wavelength becomes shorter than 1150 nanometers.

In addition, in the optical fiber 10, desired characteristics are realized by properly setting the characteristics of the core region 11 and the holes 13, such that the zero dispersion wavelength is shorter than 1150 nanometers, a light having a wavelength longer than 1000 nanometers is propagated in the fundamental mode of $LP_{01}$ mode only, and the effective core area at the wavelength of 1064 nanometers is equal to or smaller than 12.0 μm².

Preferable characteristics of the core region 11 and the holes 13 of the optical fiber 10 will be explained in detail below.

Because the core region 11 is made of germanium-doped silica glass, the refractive index of the core region 11 can be increased while suppressing the propagation loss of a light propagating through the core region 11. In the core region 11, phosphorous can be doped instead of the germanium or together with the germanium. The cladding region 12 can be made, instead of the pure silica glass, with a silica glass of which the refractive index is lowered by doping fluoride. As a method of doping the germanium or the phosphorous in the core region 11, for example, the vapor-phase axial deposition (VAD) method or the modified chemical vapor deposition (MCVD) method can be used. By using the VAD method or the MCVD method, the doping amount of the germanium or the phosphorous can be finely controlled, and as a result, the relative refractive index difference Δ1 of the core region 11 with respect to the cladding region 12 can be adjusted with 0.01% increments in between.

As long as the relative refractive index difference Δ1 of the core region 11 is equal to or larger than 1.0%, a high nonlinear refractive index of the core region 11 can be obtained because a large amount of dopant, such as the germanium or the phosphorous, is contained in the core region 11, and therefore, a high optical nonlinearity can be realized, which is highly desirable. Furthermore, if the relative refractive index difference Δ1 is equal to or smaller than 3.0%, the amount of dopant contained in the core region 11 is suppressed to a degree with which a decrease of the mechanical strength of the core region 11 is prevented. As a result, because it eliminates a risk of clacking the core region 11 when forming the holes 13 near the core region 11, a high manufacturability can be obtained, which is highly desirable.

Furthermore, because the relative refractive index difference Δ1 of the core region 11 of the optical fiber 10 is larger than 0%, the optical fiber 10 is superior to the typical photonic crystal fiber in terms of the splicing connectivity. In the typical photonic crystal fiber, the refractive index of the core region is same as the refractive index of the cladding region, and the optical confinement is obtained only by the holes. Therefore, if the holes are collapsed or deformed in the connecting portions when splicing the fibers, the optical confinement becomes weak, and as a result, the light is leaked causing an increase of the connection loss. On the other hand, in the optical fiber 10, even if the holes are collapsed or deformed when splicing the fibers, the connection loss can be kept extremely low because the optical confinement is obtained by the difference of the refractive indexes between the core region 11 and the cladding region 12.

Regarding the holes 13, it is preferable that the size of the holes 13 be equal to or larger than 1.0 micrometer to achieve an enough shift amount of the structure dispersion due to the formation of the holes 13. If the hole diameter is smaller than 1.0 micrometer, to obtain a sufficiently large shift amount of the structure dispersion, for example, it is necessary to take a structure in which the holes 13 bite into the core region 11. However, this structure is adopted, a structural propagation loss due to the holes 13 increases, and an OH group is generated on the inner surface of the holes 13 at the time of manufacturing the fiber. Then, the absorption loss caused by the OH group increases, which is not desirable. Meanwhile, the holes 13 can be formed by performing a drilling on the optical fiber preform with a mechanical drill. If the method of performing the drilling is employed, to make the hole diameter smaller than 1.0 micrometer, the manufacturing process will be extremely complicated because a hole should be formed in the optical fiber preform by the drilling with a size smaller than about 1 millimeter. Furthermore, when the hole diameter formed by the drilling is smaller than 1 millimeter, a change of balance of the hole diameter between the holes and a deformation of the holes largely affect the optical characteristics, which is not desirable. In addition, there is a necessity to make the hole diameter of the holes 13 smaller than 3.0 micrometers, and the reason will be explained later.

The characteristics of the core region 11 and the holes 13 will be explained in detail below in association with the optical characteristics of the optical fiber 10 obtained from a calculation by a simulation.

A relation between the core diameter and the effective core area of the core region 11 of the optical fiber 10 will be explained with calculation examples 1 to 6. In the calculation examples 1 to 6, the distance L in the optical fiber 10 is fixed to 0.1 micrometer, and a relation between the core diameter and the effective core area at the wavelength of 1064 nanometers is calculated while changing the relative refractive index difference Δ1 and the hole diameter. FIG. 2 is a table showing setting values of the relative refractive index difference Δ1 and the core diameter for optical fibers according to the calculation examples 1 to 6.

Figures 3, 4:
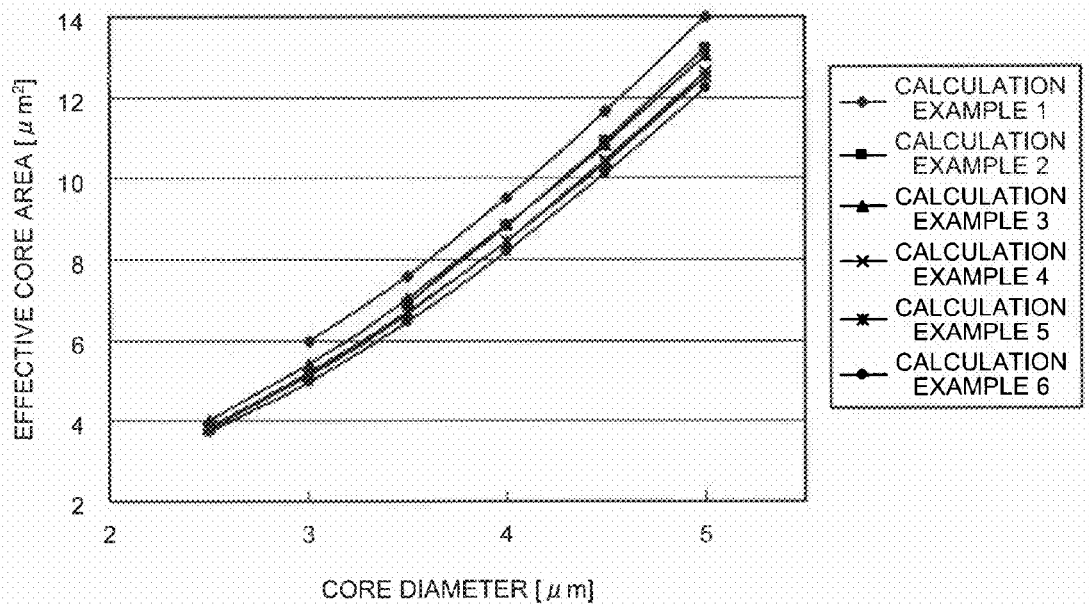
FIG. 3 is a graph showing a relation between the core diameter and the effective core area at a wavelength of 1064 nanometers for the optical fibers according to the calculation examples 1 to 6.
FIG. 4 is a table showing setting values of the core diameter and the distance L for optical fibers according to calculation examples 7 to 12.

FIG. 3 is a graph showing the relation between the core diameter and the effective core area at the wavelength of 1064 nanometers for the optical fibers according to the calculation examples 1 to 6. As shown in FIG. 3, the effective core area largely depends on the core diameter. If the core diameter is smaller than 5.0 micrometers, the effective core area can be kept equal to or below 12.0 μm², which makes it possible to realize a high optical nonlinearity. Furthermore, if the core diameter is smaller than 4.5 micrometers, the effective core area can be kept equal to or below 10.0 μm², and if the core diameter is smaller than 4.0 micrometers, the effective core area can be kept equal to or below 8.0 μm², which makes it possible to realize an even higher optical nonlinearity.

Therefore, it is preferable to make the core diameter of the core region 11 smaller than 5.0 micrometers, and is more preferable to make it smaller than 4.5 micrometers. However, as described later, the core diameter is preferably to be equal to or larger than 2.0 micrometers because the light is apt to be leaked in the long wavelength region as the core diameter decreases.

The cutoff wavelength of the optical fiber 10 will be explained with calculation examples 7 to 12. In the calculation examples 7 to 12, the hole diameter in the optical fiber 10 is fixed to 1.0 micrometer, which is the lower limit of the preferable value in the first embodiment, and a relation between the core size and the relative refractive index difference Δ1 with which the cutoff wavelength is 1000 nanometers is calculated while changing the distance L. The value of the relative refractive index difference Δ1 obtained by the calculation is the upper value of the relative refractive index difference Δ1 with which the cutoff wavelength is equal to or shorter than 1000 nanometers. FIG. 4 is a table showing setting values of the core diameter and the distance L for optical fibers according to the calculation examples 7 to 12. In addition, in the calculation examples 7 to 12, because the zero dispersion wavelength and the effective core area change, possible ranges of the zero dispersion wavelength and the effective core area in the calculation examples 7 to 12 are also shown in the table of FIG. 4. As shown in FIG. 4, if the distance L is 1.2 micrometers, the zero dispersion wavelength does not become shorter than 1150 nanometers. On the other hand, if the distance L is equal to or shorter than 0.9 micrometer, the zero dispersion wavelength can be equal to or shorter than 1150 nanometers, if the distance L is equal to or shorter than 0.7 micrometer, the zero dispersion wavelength can be equal to or shorter than 1100 nanometers, and the distance L is equal to or shorter than 0.5 micrometer, the zero dispersion wavelength can be equal to or shorter than 1050 nanometers. In addition, in the cases of the calculation examples 7 to 12, because the cutoff wavelength is equal to or shorter than 1000 nanometers, which is shorter than the zero dispersion wavelength, it is possible to propagate a light having a wavelength equal to the zero dispersion wavelength in the fundamental mode of the $LP_{01}$ mode only.

From the above fact, the distance L between the core region 11 and the holes 13 is preferably to be equal to or shorter than 1.1 micrometers, more preferably to be equal to or shorter than 0.9 micrometer, and even more preferably to be equal to or shorter than 0.6 micrometer. Meanwhile, to prevent a breakage of the core region 11 at the time of forming the holes 13 near the core region 11 and the increase of the absorption loss caused by the OH group generated on the inner surface of the holes 13, the distance L between the core region 11 and the holes 13 is preferably to be equal to or longer than 0.1 micrometer.

Figures 5, 6:
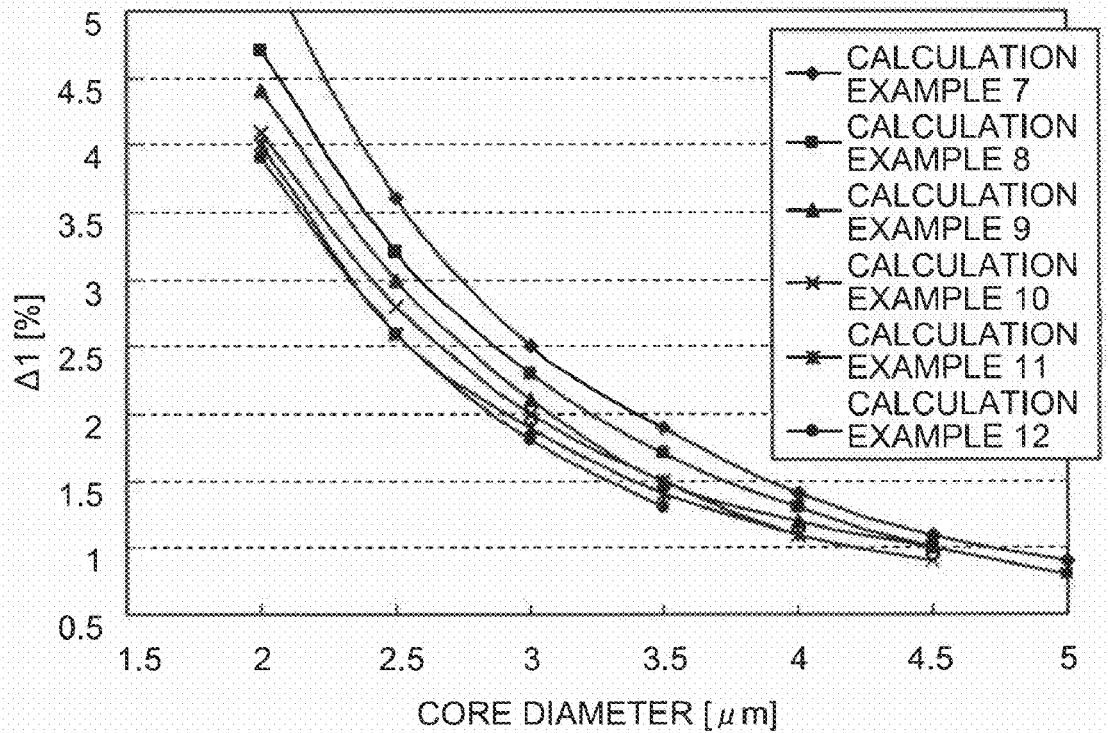
FIG. 5 is a graph showing a relation between the core diameter and the upper limit of the relative refractive index difference Δ1 with which the cutoff wavelength is equal to or shorter than 1000 nanometers for the optical fibers according to the calculation examples 7 to 12.
FIG. 6 is a table showing setting values of the core diameter and the hole diameter for optical fibers according to calculation examples 13 to 16.

FIG. 5 is a graph showing a relation between the core diameter and the upper limit of the relative refractive index difference $\Delta 1$ with which the cutoff wavelength is equal to or shorter than 1000 nanometers for the optical fibers according to the calculation examples 7 to 12. In the optical fiber 10, when the hole diameter is 1.0 micrometer, if the relative refractive index difference $\Delta 1$ is a value equal to or smaller than the upper limit shown in FIG. 5, the cutoff wavelength can be kept equal to or below 1000 nanometers, and it is possible to propagate a light having a wavelength longer than 1000 nanometers in the fundamental mode of the $LP_{01}$ mode only.

If the hole diameter is even larger, the optical confinement effect due to the holes 13 is more increased, compared with the cases of the calculation examples 7 to 12, and the light is prone to be propagated in a higher-order mode. Therefore, in order to propagate a light having a wavelength longer than 1000 nanometers in the $LP_{01}$ mode only, the upper value of the relative refractive index difference $\Delta 1$ should be smaller than the upper limit shown in FIG. 5.

A range of the hole diameter of the holes 13 of the optical fiber 10 will be explained with calculation examples 13 to 16 and calculation examples 17 to 25. In the calculation examples 13 to 16, the core diameter in the optical fiber 10 is fixed to 3.0 micrometers, and a relation between the distance L and the upper limit of the relative refractive index difference $\Delta 1$ with which the cutoff wavelength is equal to or shorter than 1000 nanometers is calculated while changing the hole diameter. FIG. 6 is a table showing setting values of the core diameter and the hole diameter for optical fibers according to the calculation examples 13 to 16.

Figures 7, 8:
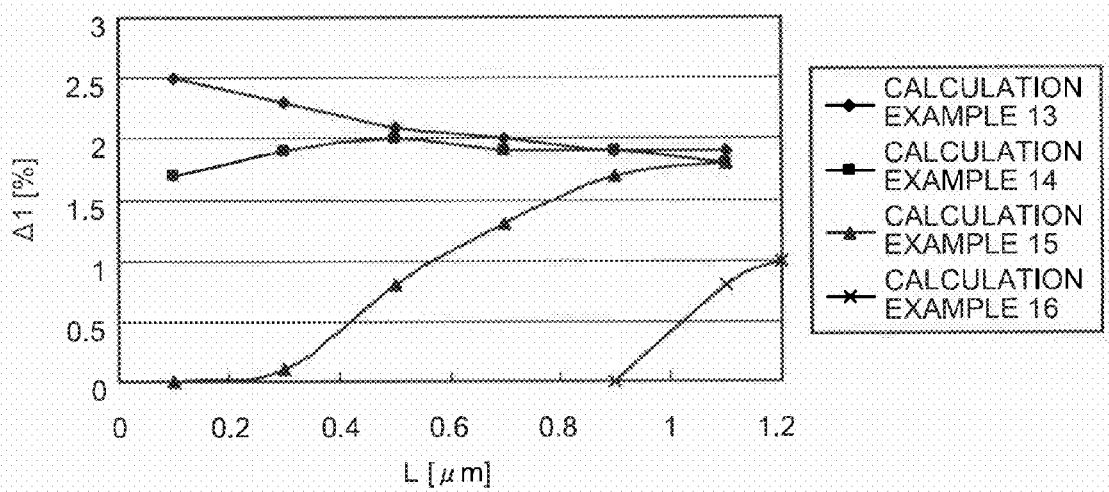
FIG. 7 is a graph showing a relation between the distance L and the upper limit of the relative refractive index difference Δ1 with which the cutoff wavelength is equal to or shorter than 1000 nanometers for the optical fibers according to the calculation examples 13 to 16.
FIG. 8 is a table showing setting values of the core diameter, the hole diameter, and the distance L, and the upper limit of the relative refractive index difference Δ1 with which the cutoff wavelength is equal to or shorter than 1000 nanometers for optical fibers according to calculation examples 17 to 25.

FIG. 7 is a graph showing a relation between the distance L and the upper limit of the relative refractive index difference $\Delta 1$ with which the cutoff wavelength is equal to or shorter than 1000 nanometers for the optical fibers according to the calculation examples 13 to 16. As shown in FIG. 7, there exists a condition with which the cutoff wavelength is equal to or shorter than 1000 nanometers under a condition that the relative refractive index difference $\Delta 1$ is in a range from 1.0% to 3.0% for the calculation examples 13 to 15 in which the hole diameter is 1.0 micrometer to 2.5 micrometers. However, for the calculation example 16, it is required to increase the distance L up to 1.2 micrometers to make the cutoff wavelength equal to or shorter than 1000 nanometers under the condition that the relative refractive index difference $\Delta 1$ is in the range from 1.0% to 3.0%. However, if the distance L is increased to 1.2 micrometers, the zero dispersion wavelength cannot be shorter than 1150 nanometers, as shown in the calculation example 12 shown in FIG. 4. Therefore, in order to make the zero dispersion wavelength equal to or shorter than 1150 nanometers while keeping the cutoff wavelength equal to or below 1000 nanometers under the condition that the relative refractive index difference $\Delta 1$ is in the range from 1.0% to 3.0%, the hole diameter is required to be smaller than 3.0 micrometers.

FIG. 8 is a table showing setting values of the core diameter, the hole diameter, and the distance L, and the upper limit of the relative refractive index difference $\Delta 1$ with which the cutoff wavelength is equal to or shorter than 1000 nanometers for optical fibers according to the calculation examples 17 to 25. In the calculation examples 17 to 25, the calculations are performed by fixing the core diameter to 4.0 micrometers or 4.5 micrometers. As shown in FIG. 8, also in the conditions of the calculation examples 17 to 25, if the hole diameter is 3.0 micrometers, the cutoff wavelength cannot be equal to or shorter than 1000 nanometers under the condition that the relative refractive index difference $\Delta 1$ is in the range from 1.0% to 3.0%.

Figures 9, 10:
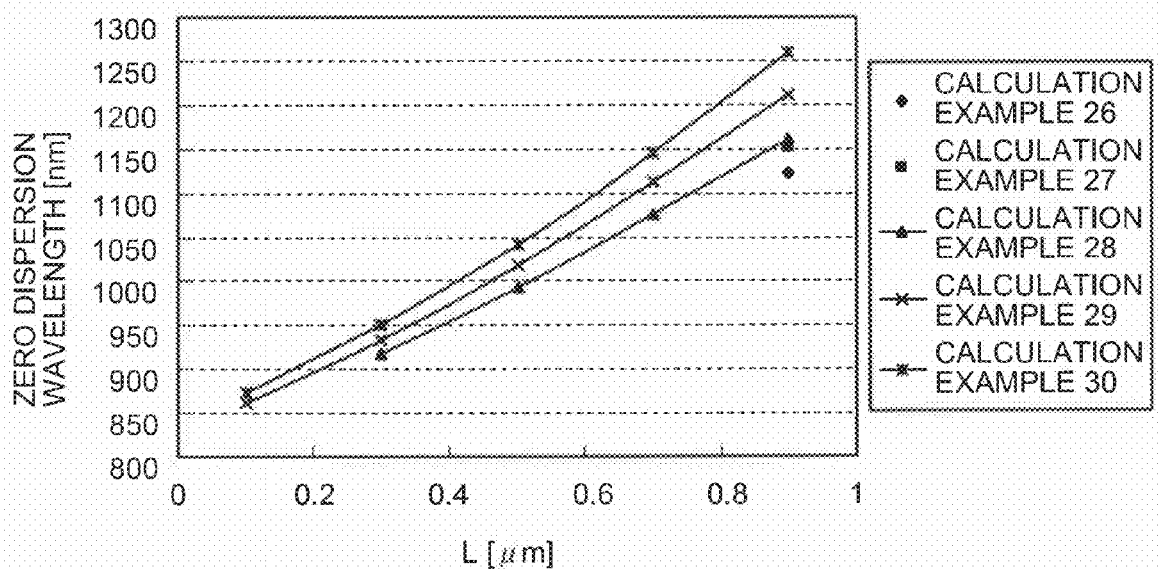
FIG. 9 is a table showing setting values of the core diameter, the hole diameter, and the relative refractive index difference Δ1 for optical fibers according to calculation examples 26 to 30.
FIG. 10 is a graph showing a relation between the distance L and the zero dispersion wavelength for the optical fibers according to the calculation examples 26 to 30.
Figure 12:
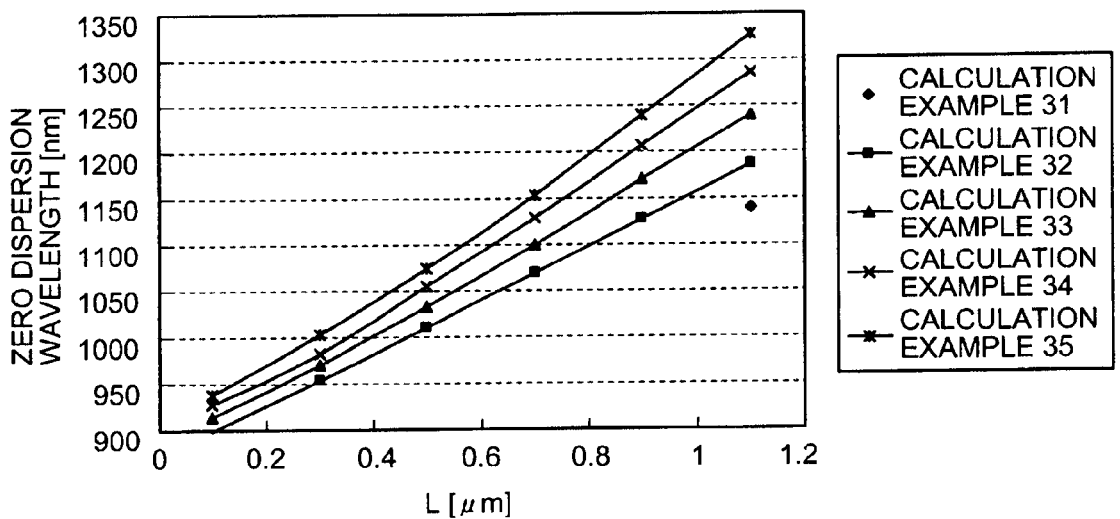
FIG. 12 is a graph showing a relation between the distance L and the zero dispersion wavelength for the optical fibers according to the calculation examples 31 to 35.
Figure 13:
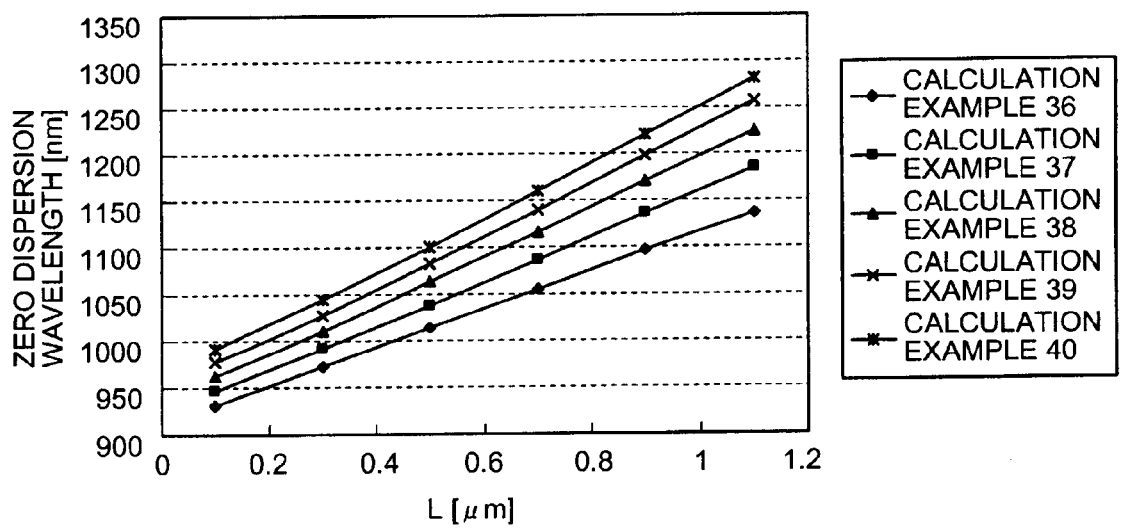
FIG. 13 is a graph showing a relation between the distance L and the zero dispersion wavelength for the optical fibers according to the calculation examples 36 to 40.
Figure 14:
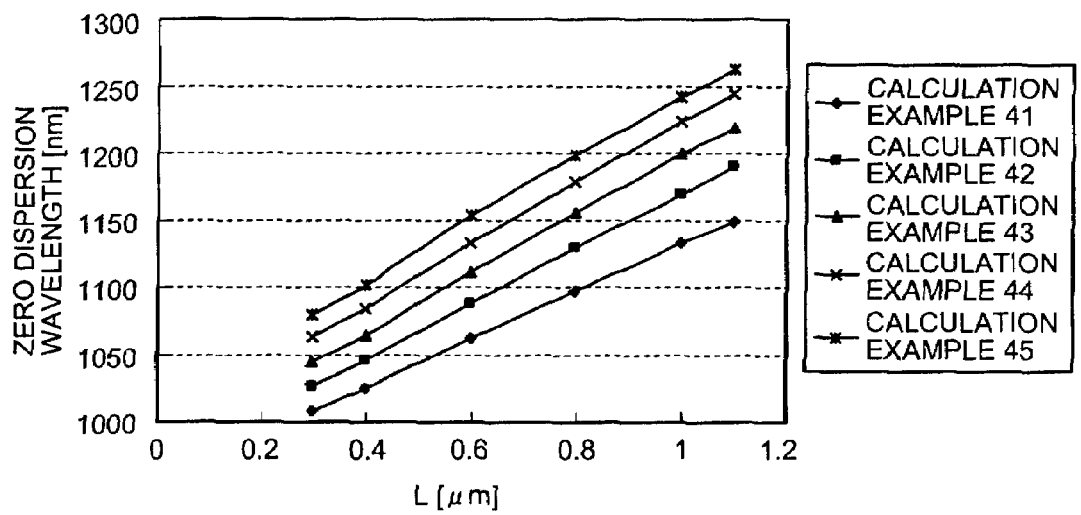
FIG. 14 is a graph showing a relation between the distance L and the zero dispersion wavelength for the optical fibers according to the calculation examples 41 to 45.
Figure 15:
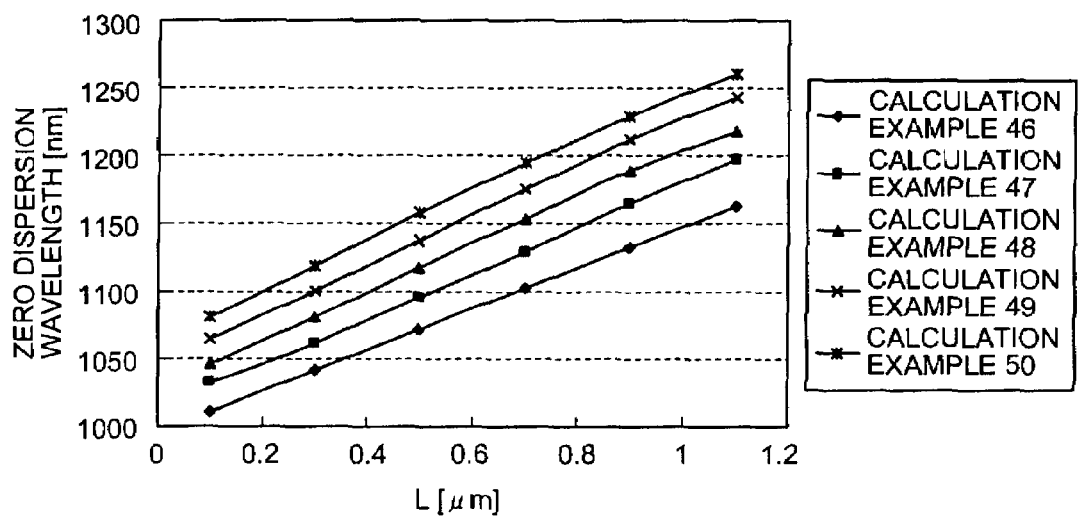
FIG. 15 is a graph showing a relation between the distance L and the zero dispersion wavelength for the optical fibers according to the calculation examples 46 to 50.

The zero dispersion wavelength of the optical fiber 10 will be explained with calculation examples 26 to 50. In the calculation examples 26 to 30, the core diameter and the hole diameter in the optical fiber 10 are fixed to 2.0 micrometers and 1.3 micrometers, respectively, and a relation between the distance L and the zero dispersion wavelength is calculated while changing the relative refractive index difference $\Delta 1$ in the range from 1.0% to 3.0%. FIG. 9 is a table showing setting values of the core diameter, the hole diameter, and the relative refractive index difference $\Delta 1$ for optical fibers according to the calculation examples 26 to 30.

FIG. 10 is a graph showing the relation between the distance L and the zero dispersion wavelength for the optical fibers according to the calculation examples 26 to 30. In FIG. 10, only a case in which a light of the $LP_{01}$ mode is propagated at the zero dispersion wavelength is shown. As shown in FIG. 10, the zero dispersion wavelength increases as the distance L increases.

FIG. 11 is a table showing setting values of the core diameter, the hole diameter, and the relative refractive index difference $\Delta 1$ for optical fibers according to the calculation examples 31 to 50. In the calculation examples 31 to 50, the calculations are performed by fixing the core diameter to a predetermined value in a range from 2.5 micrometers to 4.0 micrometers and the hole diameter to a predetermined value in a range from 1.5 micrometers to 2.5 micrometers with respect to the value of the core diameter.

FIGS. 12 to 15 are graphs showing relations between the distance L and the zero dispersion wavelength for the optical fibers according to the calculation examples 31 to 35, the calculation examples 36 to 40, the calculation examples 41 to 45, and the calculation examples 46 to 50, respectively. As shown in FIGS. 12 to 15, also in the condition of the calculation examples 31 to 50, the zero dispersion wavelength increases as the distance L increases, however, the amount of change of the zero dispersion wavelength decreases as the core diameter increases. As shown in FIGS. 9 to 15, the zero dispersion wavelength can be kept equal to or below 1150 nanometers as long as the distance L is equal to or shorter than 1.1 micrometers. Furthermore, if the distance L is equal to or shorter than 0.9 micrometer, the zero dispersion wavelength can be kept equal to or below 1100 nanometers. Even further, if the distance L is equal to or shorter than 0.6 micrometer, the zero dispersion wavelength can be kept equal to or below 1050 nanometers.

The propagation loss of the optical fiber 10 will be explained. When the holes 13 are formed around the core region 11, as the optical fiber 10, if the effective refractive index of the core region 11 is decreased below the refractive index of the cladding region 12, a light is leaked from the core region 11 to the cladding region 12, and as a result, a leakage loss is apt to occur. The following explanation will be devoted to the fact that the optical fiber 10 has a low enough leakage loss and a low enough propagation loss including the leakage loss, too, with calculation examples 51 to 63.

In the calculation examples 51 to 55, the core diameter and the hole diameter in the optical fiber 10 are fixed to 2.5 micrometers and 1.5 micrometers, respectively, and the effective core area, the zero dispersion wavelength, and the leakage loss are calculated while changing the distance L in a range from 0.1 micrometer to 0.9 micrometer when the relative refractive index difference $\Delta 1$ is appropriately changed in the range from 1.0% to 3.0%. FIG. 16 is a table showing setting values of the core diameter, the hole diameter, the distance L, and the relative refractive index difference $\Delta 1$ and calculated values of the effective core area and the zero dispersion wavelength for optical fibers according to the calculation examples 51 to 55. The optical fibers according to the calculation examples 51 to 55 satisfy a condition that the cutoff wavelength is equal to or shorter than 1000 nanometers, the zero dispersion wavelength is shorter than 1150 nanometers, and the effective core area is equal to or smaller than 12.0 $\mu m^2$.

Figure 17:
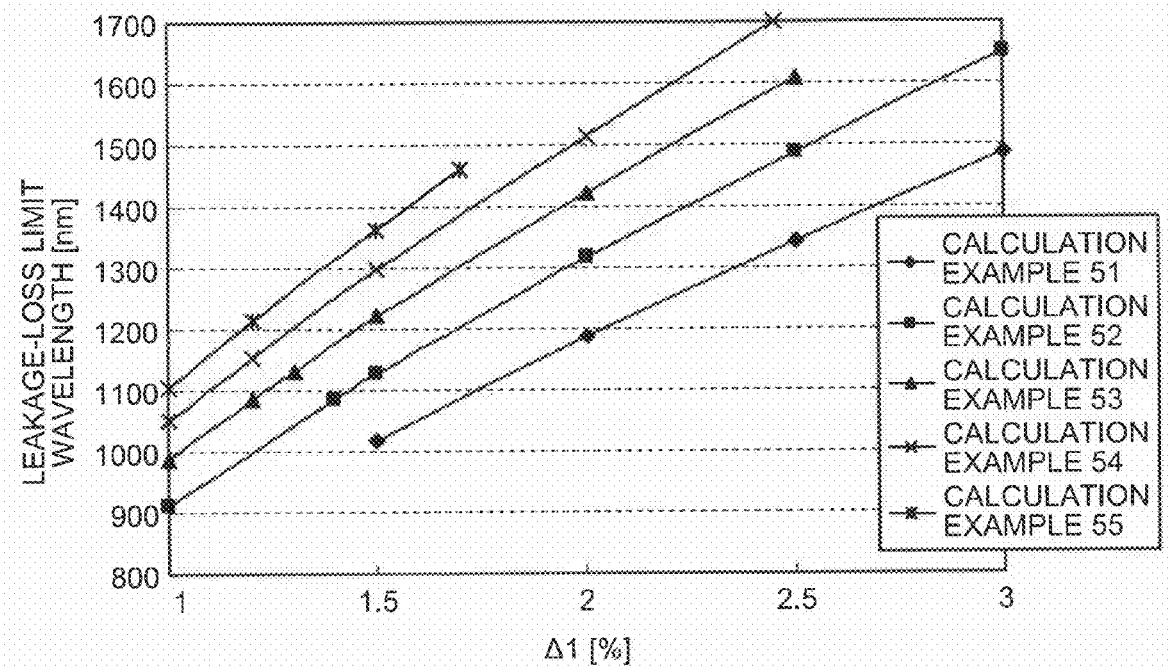
FIG. 17 is a graph showing a relation between the relative refractive index difference Δ1 and the leakage-loss limit wavelength for the optical fibers according to the calculation examples 51 to 55.

FIG. 17 is a graph showing a relation between the relative refractive index difference $\Delta 1$ and a wavelength at which the leakage loss is 1 dB/km (hereinafter, "a leakage-loss limit wavelength") for the optical fibers according to the calculation examples 51 to 55. In a wavelength region longer than the leakage-loss limit wavelength, the leakage loss drastically increases up to, for example, equal to or higher than 10,000 dB/km. As shown in FIG. 17, the leakage-loss limit wavelength increases as the relative refractive index difference $\Delta 1$ increases or the distance L increases.

Figure 19:
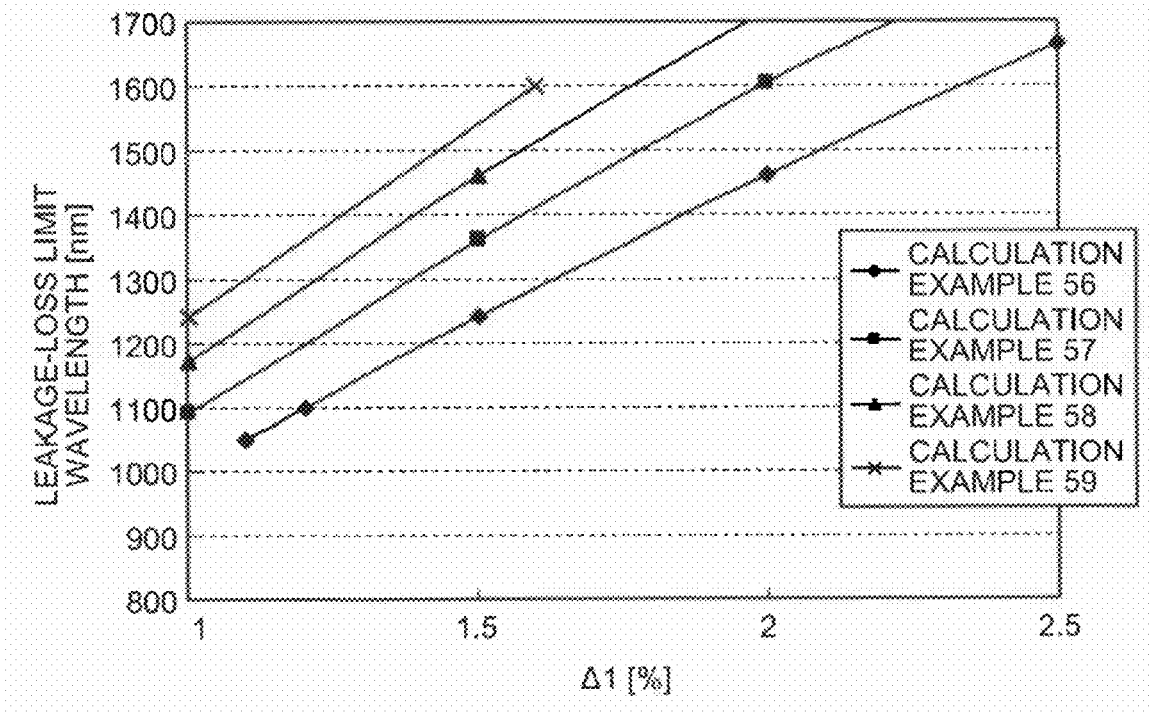
FIG. 19 is a graph showing a relation between the relative refractive index difference Δ1 and the leakage-loss limit wavelength for the optical fibers according to the calculation examples 56 to 59.

In the calculation examples 56 to 59, the core diameter and the hole diameter in the optical fiber 10 are fixed to 3.0 micrometers and 1.0 micrometer, respectively, and the effective core area, the zero dispersion wavelength, and the leakage loss are calculated while changing the distance L in a range from 0.1 micrometer to 0.7 micrometer when the relative refractive index difference $\Delta 1$ is appropriately changed in the range from 1.0% to 3.0%. FIG. 18 is a table showing setting values of the core diameter, the hole diameter, the distance L, and the relative refractive index difference $\Delta 1$ and calculated values of the effective core area and the zero dispersion wavelength for optical fibers according to the calculation examples 56 to 59. The optical fibers according to the calculation examples 56 to 59 satisfy the condition that the cutoff wavelength is equal to or shorter than 1000 nanometers, the zero dispersion wavelength is shorter than 1150 nanometers, and the effective core area is equal to or smaller than 12.0 $\mu m^2$. FIG. 19 is a graph showing a relation between the relative refractive index difference $\Delta 1$ and the leakage-loss limit wavelength for the optical fibers according to the calculation examples 56 to 59. Also in the case shown in FIG. 19, as in the case shown in FIG. 17, the leakage-loss limit wavelength increases as the relative refractive index difference $\Delta 1$ increases or the distance L increases.

Figure 21:
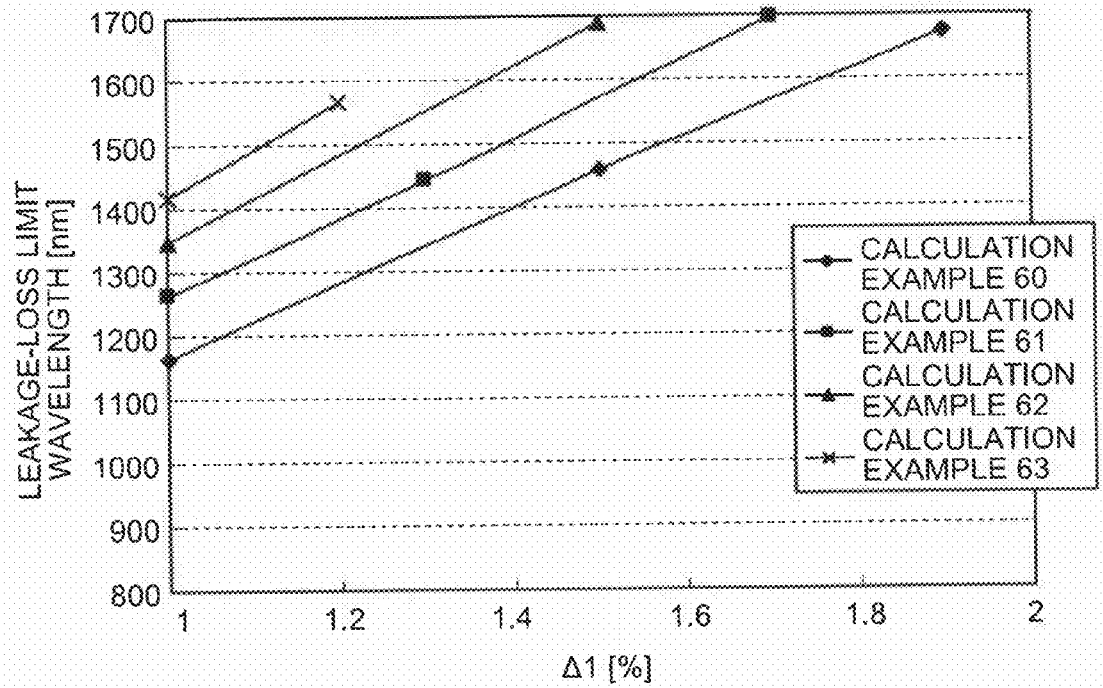
FIG. 21 is a graph showing a relation between the relative refractive index difference Δ1 and the leakage-loss limit wavelength for the optical fibers according to the calculation examples 60 to 63.

In the calculation examples 60 to 63, the core diameter and the hole diameter in the optical fiber 10 are fixed to 3.5 micrometers and 1.0 micrometer, respectively, and the effective core area, the zero dispersion wavelength, and the leakage loss are calculated while changing the distance L in a range from 0.1 micrometer to 0.7 micrometer when the relative refractive index difference $\Delta 1$ is appropriately changed in the range from 1.0% to 3.0%. FIG. 20 is a table showing setting values of the core diameter, the hole diameter, the distance L, and the relative refractive index difference $\Delta 1$ and calculated values of the effective core area and the zero dispersion wavelength for optical fibers according to the calculation examples 60 to 63. The optical fibers according to the calculation examples 60 to 63 satisfy the condition that the cutoff wavelength is equal to or shorter than 1000 nanometers, the zero dispersion wavelength is shorter than 1150 nanometers, and the effective core area is equal to or smaller than 12.0 $\mu m^2$. FIG. 21 is a graph showing a relation between the relative refractive index difference $\Delta 1$ and the leakage-loss limit wavelength for the optical fibers according to the calculation examples 60 to 63. Also in the case shown in FIG. 21, as in the cases shown in FIGS. 17 and 19, the leakage-loss limit wavelength increases as the relative refractive index difference $\Delta 1$ increases or the distance L increases.

In the propagation loss of the optical fiber 10, a loss caused by a factor other than the leakage loss, such as the Rayleigh scattering, is on the order of equal to or lower than 0.5 dB/km. Therefore, in the optical fiber 10, if the leakage-loss limit wavelength is set to a wavelength longer than a desired wavelength band, the propagation loss is equal to or lower than 20 dB/km in the desired wavelength band, which makes it possible to propagate a light along a length of a few tens meters to a few kilometers with a low loss.

In the optical fiber 10, if the propagation loss is equal to or lower than 20 dB/km at a wavelength of 1000 nanometers to 1150 nanometers, it can be suitably used in a wavelength band near 1000 nanometers, which is highly desirable. Furthermore, if the leakage-loss limit wavelength of the optical fiber 10 is set such that a difference between the maximum value and the minimum value of the propagation loss is equal to or lower than 20 dB/km in a wavelength range of plus minus 200 nanometers with the zero dispersion wavelength as the center wavelength, for example, when a supercontinuum (SC) light is generated near the zero dispersion wavelength, it is possible to output the SC light across a bandwidth of 200 nanometers with a low loss, which is highly desirable.

Furthermore, if the propagation loss is equal to or lower than 20 dB/km at a wavelength of 1500 nanometers to 1625 nanometers, it is possible to propagate a light in the C band (about 1530 nanometers to 1565 nanometers) and the L band (about 1565 nanometers to 1625 nanometers) used in the optical fiber communication with a low loss. Therefore, by using the optical fiber 10, for example, when an SC light is generated, which is spread across the C band and the L band, using a light in a wavelength band near 1000 nanometers as the pumping light, it is possible to output a light in the C band or the L band with a low loss. For example, by setting the relative refractive index difference $\Delta 1$ to 3.0% in the calculation example 52 and to 2.3% in the calculation example 54 shown in FIGS. 16 and 17, it is possible to make the propagation loss equal to or lower than 20 dB/km at a wavelength of 1500 nanometers to 1625 nanometers.

As an embodiment example 1 the present invention, the optical fiber according to the first embodiment is fabricated using the following method. A porous preform made of germanium-doped silica glass is fabricated by the VAD method, and the porous preform is vitrified to fabricate a core preform made of silica glass for forming the core region. The core preform has a diameter of 6.54 millimeters, a relative refractive index difference of 2.1% with respect to the pure silica glass, and a step index type refractive index profile. Subsequently, a pure silica glass layer is formed on the outer circumference of the core preform by the outside vapor deposition (OVD) method to make an optical fiber preform with the outer diameter of 40 millimeters. After that, a drilling is performed using a mechanical drill on the facet of the optical fiber preform to form six holes around the core preform such that the holes are arranged to make a six-fold rotational symmetry centering around the core preform, and the inner surfaces of the holes are lapped such that the hole diameter becomes 3.6 millimeters. The distance between the center of the core preform and the center of the hole is set to 5.6 millimeters. Then, the optical fiber preform in which the holes are formed is elongated such that the outer diameter of the optical fiber preform becomes 10 millimeters, the elongated optical fiber preform is inserted into a jacket tube made of pure silica glass with the outer diameter of 40 millimeters and the inner diameter of 10 millimeters, and the optical fiber preform and the jacket tube are integrated. Finally, the integrated optical fiber preform and the jacket tube is drawn to fabricate the optical fiber according to the embodiment example 1.

The fabricated optical fiber according to the embodiment example 1 has the core diameter of 3.27 micrometers, the relative refractive index difference $\Delta 1$ of the core region with respect to the cladding region of 2.1%, the cladding diameter of 80 micrometers, the hole diameter of 1.8 micrometers, and the distance L between the core region and the holes of 0.265 micrometer.

Figure 22:
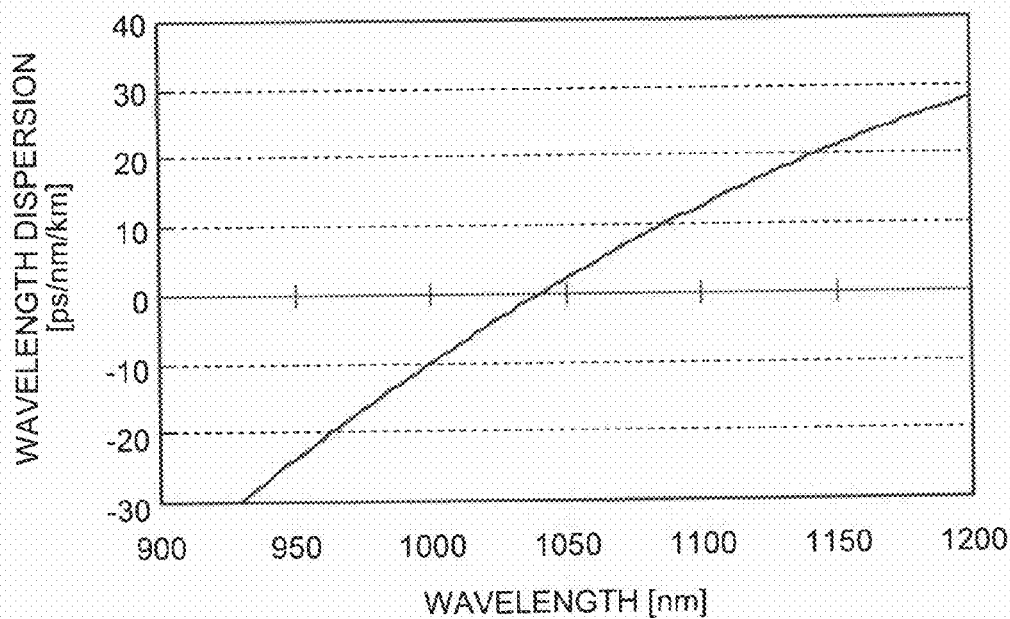
FIG. 22 is a graph showing the wavelength dispersion characteristic of an optical fiber according to an embodiment example 1.

FIG. 22 is a graph showing the wavelength dispersion characteristic of the optical fiber according to the embodiment example 1. As shown in FIG. 22, the zero dispersion wavelength of the optical fiber according to the embodiment example 1 is about 1040 nanometers, which is shorter than 1050 nanometers. Furthermore, the cutoff wavelength of the optical fiber according to the embodiment example 1 is 990 nanometers, which can propagate a light having a wavelength longer than 1000 nanometers in the $LP_{01}$ mode only. In addition, the optical fiber according to the embodiment example 1 has the propagation loss at a wavelength of 1000 nanometers to 1200 nanometers equal to or lower than 2.0 dB/km, which is low enough, the propagation loss at a wavelength of 900 nanometers to 1250 nanometers equal to or lower than 10 dB/km, and the propagation loss at a wavelength of 1500 nanometers to 1625 nanometers equal to or lower than 3.0 dB/km, which is low enough, too. Moreover, the connection loss at the time of splicing with a standard single-mode optical fiber is about 0.3 dB, which is low enough.

An optical fiber according to an embodiment example 2 is fabricated with the diameter of the core preform set to 4.185 millimeters, the hole diameter set to 2.304 millimeters, the distance between the center of the core preform and the center of the hole set to 3.583 millimeters, and the cladding diameter drawn to be 125 micrometers. Other conditions are same as those in the embodiment example 1. Although the fabricated optical fiber according to the embodiment example 2 has the cladding diameter of 125 micrometers, other factors such as the core diameter, the hole diameter, and the distance L are virtually same as those of the optical fiber according to the embodiment example 1, and the optical characteristics of the optical fiber, such as the zero dispersion wavelength and the like, are virtually same as those of the optical fiber according to the embodiment example 1, too. In this manner, by appropriately adjusting the diameter of the core preform and the like, optical fibers having the same optical characteristics can be manufactured with the cladding diameter taken to be 70 micrometers to 150 micrometers.

Figure 23:
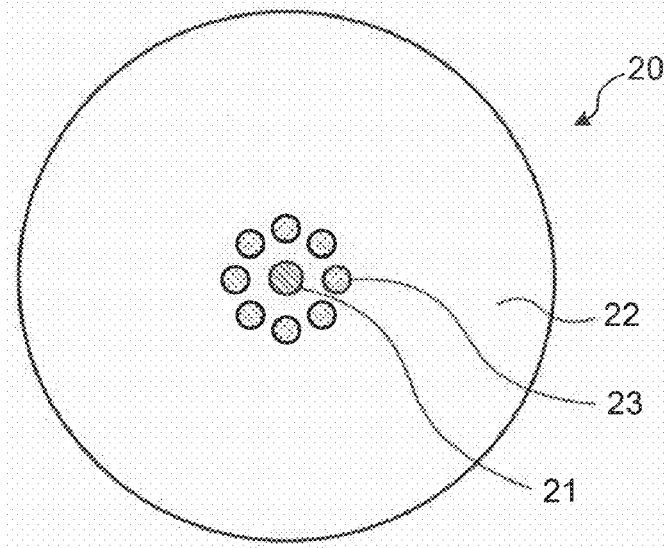
FIG. 23 is a schematic cross section of an optical fiber according to a second embodiment of the present invention.

A second embodiment of the present invention will be explained. Unlike the optical fiber 10 according to the first embodiment, an optical fiber 20 according to the second embodiment has eight holes in the cladding region. FIG. 23 is a schematic cross section of the optical fiber 20 according to the second embodiment. As shown in FIG. 23, the optical fiber 20 includes a core region 21 and a cladding region 22 formed on the outer circumference of the core region 21.

The cladding region 22 has eight holes 23 arranged around the core region 21. The cross section of each of the holes 23 is circular, two adjacent holes makes an angle of 45 degrees with the center of the core region 21, and each of the holes is arranged at a constant distance from the center of the core region 21, such that the holes 23 are arranged to make an eight-fold rotational symmetry centering around the core region 21.

In the optical fiber 20, the core diameter of the core region 21 is set to 3.0 micrometers, the relative refractive index difference $\Delta 1$ is set to 2.0%, the hole diameter of each of the holes 23 is set to 1.0 micrometer, and the distance L between the core region 21 and each of the holes 23 is set to 0.5 micrometer. As a result, the optical fiber 20 can achieve the zero dispersion wavelength of 1065 nanometers, the cutoff wavelength of 960 nanometers, and the effective core area at the wavelength of 1064 nanometers of 6.44 $\mu m^2$.

The desired characteristics of the core region 21 and the holes 23 of the optical fiber 20 can be appropriately determined through a study similar to that in the first embodiment.

Figure 24:
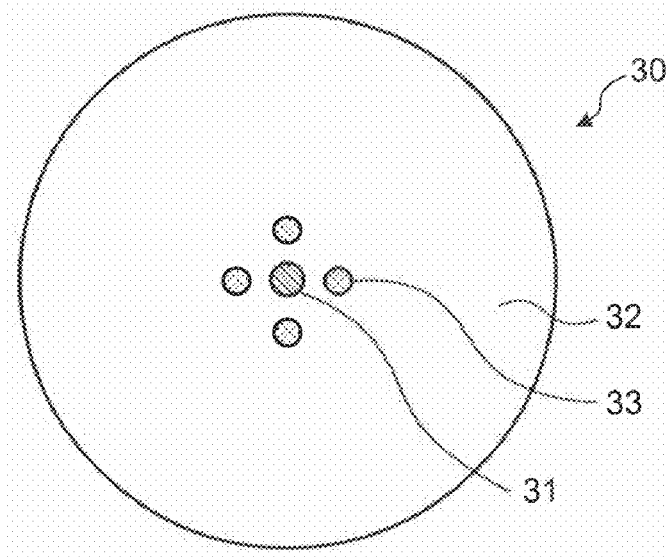
FIG. 24 is a schematic cross section of an optical fiber according to a third embodiment of the present invention.

A third embodiment of the present invention will be explained. Unlike the optical fibers 10 and 20 according to the first and the second embodiments, an optical fiber 30 according to the third embodiment has four holes in the cladding region. FIG. 24 is a schematic cross section of the optical fiber 30 according to the third embodiment. As shown in FIG. 24, the optical fiber 30 includes a core region 31 and a cladding region 32 formed on the outer circumference of the core region 31.

The cladding region 32 has four holes 33 arranged around the core region 31. The cross section of each of the holes 33 is circular, two adjacent holes makes an angle of 90 degrees with the center of the core region 31, and each of the holes is arranged at a constant distance from the center of the core region 31, such that the holes 33 are arranged to make a four-fold rotational symmetry centering around the core region 31.

In the optical fiber 30, the core diameter of the core region 31 is set to 2.5 micrometers, the relative refractive index difference $\Delta 1$ is set to 2.5%, the hole diameter of each of the holes 33 is set to 2.0 micrometers, and the distance L between the core region 31 and each of the holes 33 is set to 0.25 micrometer. As a result, the optical fiber 30 can achieve the zero dispersion wavelength of 1025 nanometers, the cutoff wavelength of 900 nanometers, and the effective core area at the wavelength of 1064 nanometers of 4.56 $\mu m^2$.

The desired characteristics of the core region 31 and the holes 33 of the optical fiber 30 can be appropriately determined through a study similar to that in the first embodiment.

As a modification example of the third embodiment, in the optical fiber 30, the core diameter of the core region 31 can be set to 3.8 micrometers, the relative refractive index difference $\Delta 1$ can be set to 1.3%, the hole diameter of each of the holes 33 can be set to 3.0 micrometers, and the distance L between the core region 31 and each of the holes 33 can be set to 0.65 micrometer. A calculation of the optical characteristics of the optical fiber according to the modification example by a simulation shows desirable characteristics that the zero dispersion wavelength is 1135 nanometers, the cutoff wavelength is 1000 nanometers, the effective core area is 10.6 µm² at the wavelength of 1064 nanometers and 12.9 µm² at the wavelength of 1550 nanometers.

As an embodiment example 3, the optical fiber according to the modification example is fabricated. The fabrication method for the optical fiber according to the embodiment example 3 is same as those for the optical fibers according to the embodiment examples 1 and 2. The optical characteristics of the fabricated optical fiber according to the embodiment example 3 show that the zero dispersion wavelength is 1137 nanometers, the cutoff wavelength is 984 nanometers, the effective core area is 10.5 µm² at the wavelength of 1064 nanometers and 12.2 µm² at the wavelength of 1550 nanometers, which are desirable characteristics that virtually agree with the above calculation result. In addition, the optical fiber according to the embodiment example 3 has the propagation loss at the wavelength of 1550 nanometers of 3.15 dB/km and the propagation loss at a wavelength of 1500 nanometers to 1625 nanometers equal to or lower than 5 dB/km, which shows that the increase of the leakage loss is well suppressed.

A fourth embodiment of the present invention will be explained. An optical fiber 40 according to the fourth embodiment has six holes as the optical fiber 10 according to the first embodiment, however, the optical fiber 40 is different from the optical fiber 10 in a fact that the cladding region further includes a low refractive index layer formed around the core region.

Figure 25:
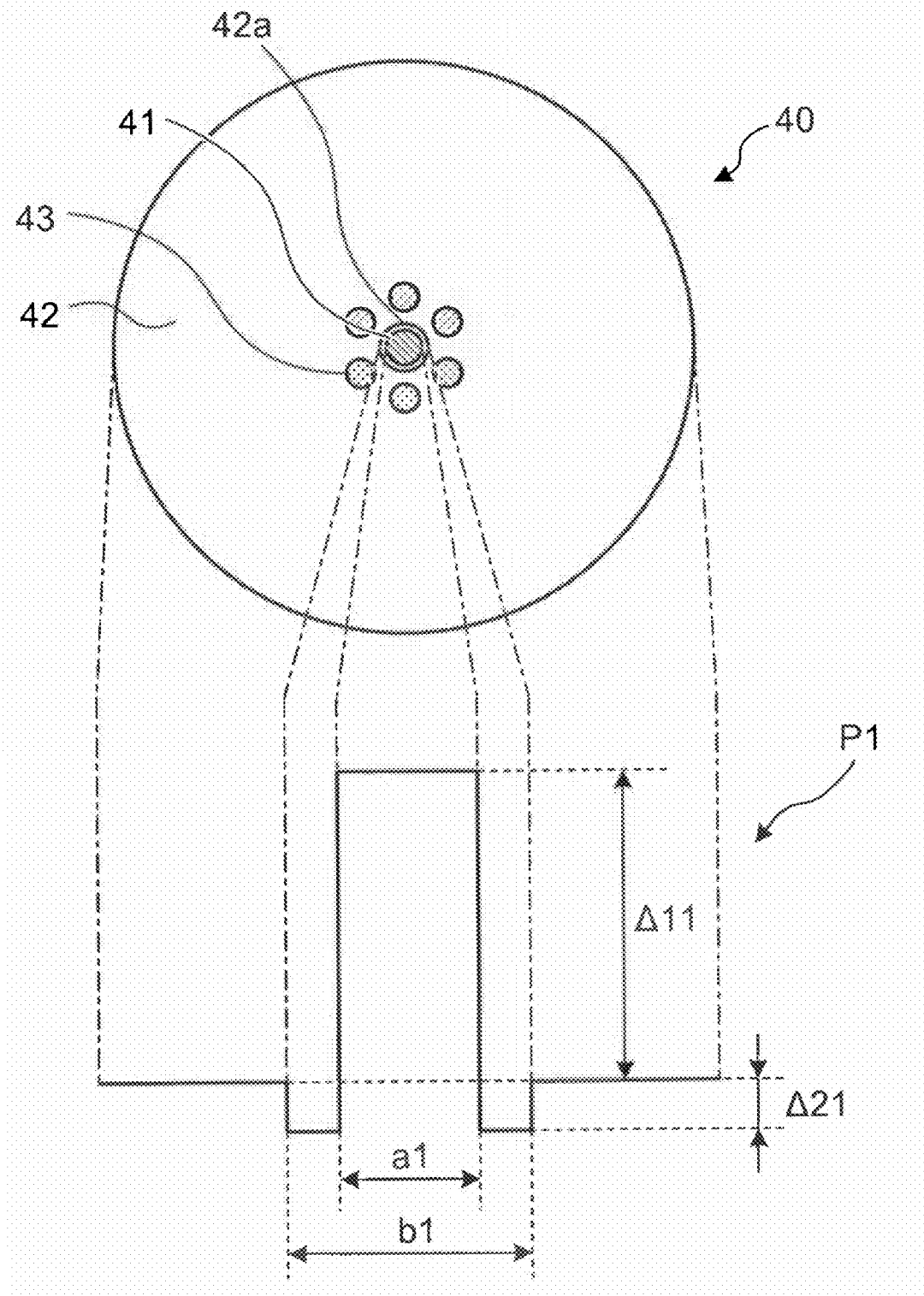
FIG. 25 is a schematic cross section of an optical fiber according to a fourth embodiment of the present invention and its refractive index profile.

FIG. 25 is a schematic cross section of the optical fiber 40 according to the fourth embodiment and its refractive index profile. As shown in FIG. 25, the optical fiber 40 includes a core region 41 and a cladding region 42 formed on the outer circumference of the core region 41. The cladding region 42 has six holes 43 arranged around the core region 41. The holes 43 are arranged to make a six-fold rotational symmetry centering around the core region 41. In addition, in the optical fiber 40, the cladding region 42 further includes a low refractive index layer 42a formed around the core region 41.

In FIG. 25, a refractive index profile P1 shows a refractive index profile on a cross section that passes through the center axis of the core region 41 and that does not include the holes 43. In the figure, α11 shows the relative refractive index difference of the core region 41, and Δ21 shows the relative refractive index difference of the low refractive index layer 42a with respect to the cladding region 42 excluding the low refractive index layer 42a. As shown in the refractive index profile P1, the refractive index of the low refractive index layer 42a is lower than the refractive index of the cladding region 42. In this manner, by forming the low refractive index layer 42a around the core region 41, the optical confinement of the core region 41 becomes stronger, and the effective core area is decreased. As a result, the optical nonlinearity of the optical fiber 40 is more increased.

The relative refractive index difference Δ11 is, for example, 2.02%, and the relative refractive index difference Δ21 is, for example, −0.2%. In addition, a core diameter a1 of the core region 41 and an outer diameter b1 of the low refractive index layer 42a of the optical fiber 40 are, for example, 3.0 micrometers to 3.3 micrometers and 3.6 micrometers, respectively. The outer diameter b1 of the low refractive index layer 42a is defined as a diameter at a position having relative refractive index difference of a half of Δ21 in the boundary area between the low refractive index layer 42a and the cladding region 42. The hole diameter of each of the holes 43 is, for example, 1.0 micrometer to 1.25 micrometers, and the distance L between the core region 41 and each of the holes 43 is, for example, 0.2 micrometer to 0.43 micrometer.

A result of calculation of the optical characteristics of the optical fiber 40 by a simulation will be explained. FIG. 26 is a table showing setting values of the core diameter, the hole diameter, and the distance L, and calculated values of the cutoff wavelength, the effective core area, and the zero dispersion wavelength for optical fibers according to calculation examples 64 to 75. In the calculation examples 64 to 75, the relative refractive index difference Δ11 is fixed to 2.02%, the relative refractive index difference Δ21 is fixed to −0.2%, and the outer diameter b1 is fixed to 3.6 micrometers. The effective core area indicates a value at the wavelength of 1064 nanometers.

As shown in FIG. 26, in the optical fiber 40, the cutoff wavelength is equal to or shorter than 1000 nanometers, the zero dispersion wavelength is shorter than 1100 nanometers, and the effective core area at the wavelength of 1064 nanometers is as small as 7.0 µm². Furthermore, in the calculation examples 64 to 75, the leakage loss of the optical fiber 40 at a wavelength shorter than 1625 nanometers is equal to or lower than 0.01 dB/km in all cases. Therefore, the propagation loss including a loss caused by a factor other than the leakage loss, such as the Rayleigh scattering is expected to be equal to or lower than 20 dB/km.

A fifth embodiment of the present invention will be explained. An optical fiber 50 according to the fourth embodiment is same as the optical fiber 40 according to the fourth embodiment in that the cladding region includes a low refractive index layer, however, the optical fiber 50 is different from the optical fiber 40 in a fact that the refractive index profile of the core region has an α-powered refractive index profile.

Figure 27:
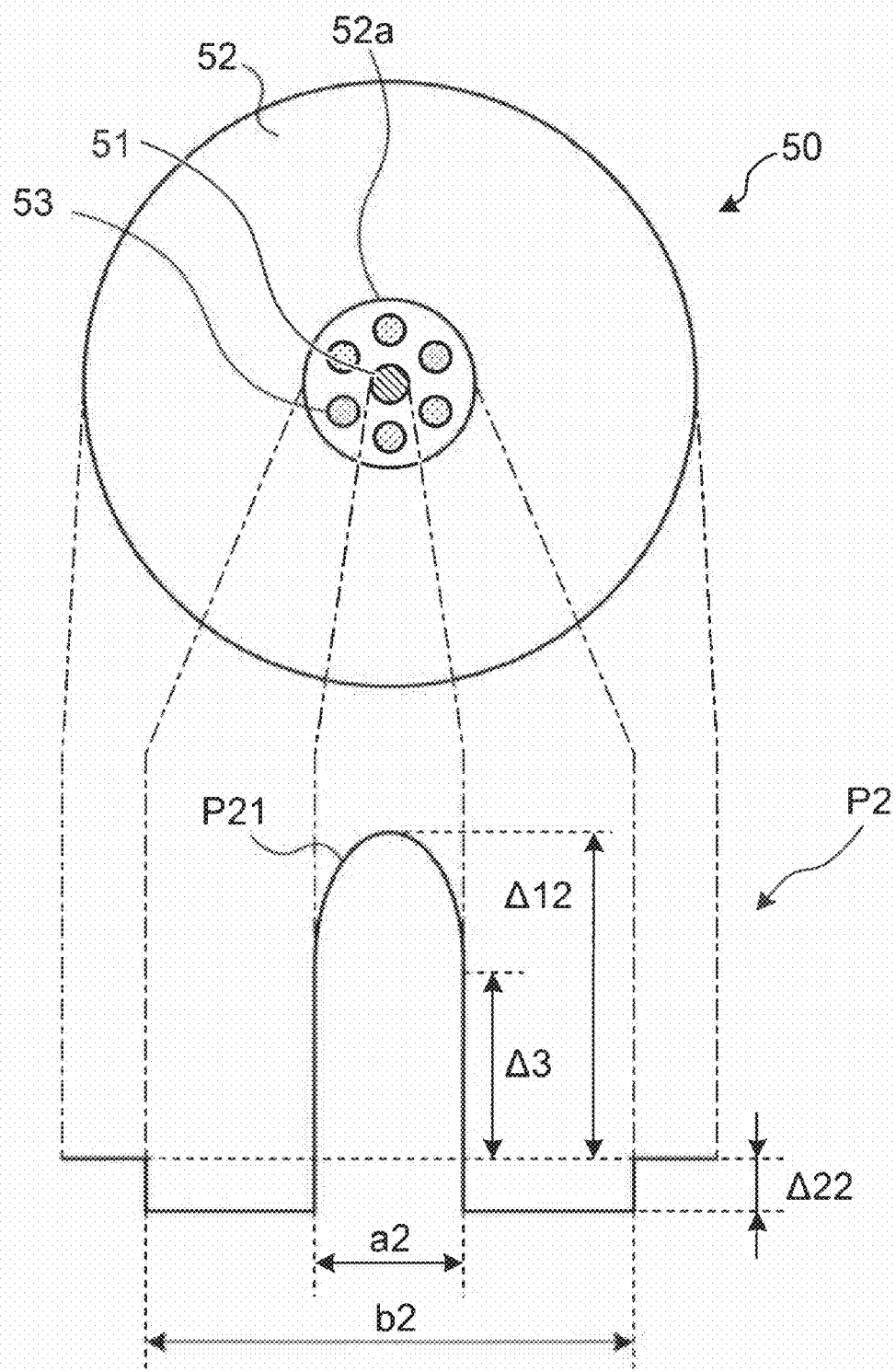
FIG. 27 is a schematic cross section of an optical fiber according to a fifth embodiment of the present invention and its refractive index profile.

FIG. 27 is a schematic cross section of the optical fiber 50 according to the fifth embodiment and its refractive index profile. As shown in FIG. 27, the optical fiber 50 includes a core region 51 and a cladding region 52 formed on the outer circumference of the core region 51. The cladding region 52 has six holes 53 arranged around the core region 51. The holes 53 are arranged to make a six-fold rotational symmetry centering around the core region 51. In addition, in the optical fiber 50, the cladding region 52 further includes a low refractive index layer 52a formed around the core region 41.

A refractive index profile P2 shows a refractive index profile on a cross section that passes through the center axis of the core region 51 and that does not include the holes 53. In FIG. 27, Δ12 shows the relative refractive index difference of the core region 51, and Δ22 shows the relative refractive index difference of the low refractive index layer 52a with respect to the cladding region 52 excluding the low refractive index layer 52a. As shown in the refractive index profile P2, the refractive index of the low refractive index layer 52a is lower than the refractive index of the cladding region 52. In this manner, by forming the low refractive index layer 52a around the core region 51, the optical confinement of the core region 51 becomes stronger, and the effective core area is decreased. As a result, the optical nonlinearity of the optical fiber 50 is more increased as in the case of the optical fiber 40.

In the refractive index profile P2, a refractive index profile P21 of the core region 51 has an α-powered shape with α=2. When the relative refractive index difference of the core region 51 at a position of a distance r from the center toward the outer circumference is Δ(r) and the core diameter of the core region 51 is a2, the refractive index profile P21 has a shape indicated by Equation (2)

$$\Delta(r)=1.02\times\{1-(2r/a2)^\alpha\}+1 (\%) \qquad (2)$$

where "^" is a symbol representing an exponential.

As indicated by Equation (2), the refractive index profile P21 of the core region 51 has the α-powered shape from the center (r=0) to a distance at which Δ(r) is 1% (r=a2), and as r is increased larger than a2, the relative refractive index difference is abruptly decreased to 0%, which is same as the step index profile. In FIG. 27, Δ3 indicates a height at which the relative refractive index difference is 1%. In the case of the optical fiber 50, unlike the cases of the optical fibers 10 to 40 according to the first to the fourth embodiments, the core diameter of the core region 51 is defined as a diameter at the position at which Δ(r) is 1%.

The relative refractive index difference Δ12 is, for example, 2.02%, and the relative refractive index difference Δ22 is, for example, −0.2%. An outer diameter of the low refractive index layer 52a of the optical fiber 50 is, for example, 2.27 times a core diameter a2 of the core region 51.

A result of calculation of the optical characteristics of the optical fiber 50 by a simulation will be explained. FIG. 28 is a table showing setting values of the core diameter, the hole diameter, and the distance L, and calculated values of the cutoff wavelength, the effective core area, and the zero dispersion wavelength for optical fibers according to calculation examples 76 to 78. In the calculation examples 76 to 78, the relative refractive index difference Δ12 is fixed to 2.02%, the relative refractive index difference Δ22 is fixed to −0.2%, and the outer diameter b2 is changed such that it becomes 2.27 times the core diameter a2. The effective core area indicates a value at the wavelength of 1064 nanometers.

As shown in FIG. 28, in the optical fiber 50, the cutoff wavelength is equal to or shorter than 1000 nanometers, the zero dispersion wavelength is shorter than 1100 nanometers, and the effective core area at the wavelength of 1064 nanometers is as small as 6.0 μm². Furthermore, also in the calculation examples 76 to 78, the leakage loss of the optical fiber 50 at the wavelength shorter than 1625 nanometers is equal to or lower than 0.01 dB/km in all cases, and the propagation loss is expected to be equal to or lower than 20 dB/km.

A sixth embodiment of the present invention will be explained. An optical device 100 according to the sixth embodiment includes the optical fiber 10 according to the first embodiment, and generates an SC light.

FIG. 29 is a schematic block diagram of the optical device 100 according to the sixth embodiment. As shown in FIG. 29, the optical device 100 includes a light source 60, an optical input unit 70, an optical fiber 10 according to the first embodiment, and an optical output unit 80.

The light source 60 is, for example, a YAG laser, and outputs a pulse laser light L1 having a wavelength of 1064 nanometers, a pulse width equal to or shorter than 100 picoseconds, and an average optical intensity equal to or larger than 1 watt through an optical fiber 60a. The optical input unit 70 is, for example, an optical system or an optical connector, receives the pulse laser light L1 from the light source 60, and inputs the pulse laser light L1 to the optical fiber 10.

In the optical fiber 10, the core diameter is 3.0 micrometers, the relative refractive index difference Δ1 is 1.9%, the hole diameter is 2.0 micrometers, and the distance L is 0.5 micrometer. With this structure, the cutoff wavelength becomes 990 nanometers, and the pulse laser light L1 having the wavelength of 1064 nanometers is propagated in the $LP_{01}$ mode only. Furthermore, the zero dispersion wavelength is 1057 nanometers that is a wavelength near the wavelength of the pulse laser light L1, and the effective core area at the wavelength of 1064 nanometers is as small as 6.5 μm². As a result, the optical fiber 10 exhibits a high optical nonlinearity. The optical fiber 10 uses the pulse laser light L1 input from the optical input unit 70 to cause the nonlinear optical phenomenon such as the self phase modulation with a high efficiency, and generates a broadband SC light L2. The generated SC light L2 is output from the optical output unit 80 that is formed with, for example, an optical system or an optical connector.

In the sixth embodiment, other type of light source having an oscillation wavelength near the wavelength of 1100 nanometers can be used as the light source 60, such as an optical fiber laser using a ytterbium-doped fiber (YDF). The core diameter and the hole diameter of the optical fiber 10 can be appropriately adjusted according to the light source used, such that a broadband SC light can be obtained. In addition, as a substitute for the optical fiber 10, the optical fibers 20 to 50 according to the second to the fifth embodiments can be used.

Although the optical device 100 according to the sixth embodiment is for generating the SC light, the optical device according to the present invention is not limited to the one for generating the SC light, and it can also be applied to, for example, a wavelength conversion optical device using the four wave mixing as the nonlinear optical phenomenon.

According to one aspect of the present invention, it is possible to realize a single-mode optical fiber that can be easily fabricated at low cost and is suitable for a nonlinear optical device used in a wavelength band near 1000 nanometers and an optical device employing the optical fiber.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber comprising:
   a core region through which a light propagates; and
   a cladding region formed on an outer circumference of the core region, the cladding region including a plurality of holes arranged around the core region and having a refractive index lower than a refractive index of the core region, wherein
   a zero dispersion wavelength of the optical fiber is shorter than 1150 nanometers,
   the optical fiber propagates a light having a wavelength longer than 1000 nanometers exclusively in a fundamental mode of $LP_{01}$ mode, and
   an effective core area of the optical fiber is equal to or smaller than 12.0 μm² at a wavelength of 1064 nanometers.

2. The optical fiber according to claim 1, wherein the optical fiber propagates a light having a wavelength same as the zero dispersion wavelength exclusively in the fundamental mode of $LP_{01}$ mode.

3. The optical fiber according to claim 1, wherein a difference between a maximum value and a minimum value of a propagation loss of the optical fiber in a wavelength range of plus minus 200 nanometers with the zero dispersion wavelength as a center wavelength is equal to or lower than 20 dB/km.

4. The optical fiber according to claim 1, wherein the effective core area is equal to or smaller than 10.0 μm².

5. The optical fiber according to claim 4, wherein the effective core area is equal to or smaller than 8.0 μm².

6. The optical fiber according to claim 1, wherein the zero dispersion wavelength is shorter than 1100 nanometers.

7. The optical fiber according to claim 6, wherein the zero dispersion wavelength is shorter than 1050 nanometers.

8. The optical fiber according to claim 1, wherein a propagation loss of the optical fiber is equal to or lower than 20 dB/km at a wavelength in a range from 1000 nanometers to 1150 nanometers.

9. The optical fiber according to claim 1, wherein a propagation loss of the optical fiber is equal to or lower than 20 dB/km at a wavelength in a range from 1500 nanometers to 1625 nanometers.

10. The optical fiber according to claim 1, wherein the core region is made of either one of germanium-doped silica glass and phosphorous-doped silica glass.

11. The optical fiber according to claim 1, wherein a relative refractive index difference between the core region and the cladding region is 1.0% to 3.0%.

12. The optical fiber according to claim 1, wherein a diameter of the core region is smaller than 5.0 micrometers.

13. The optical fiber according to claim 12, wherein a diameter of the core region is smaller than 4.5 micrometers.

14. The optical fiber according to claim 1, wherein
the cladding region includes six holes arranged around the core region, and
each of the holes is arranged to make a six-fold rotational symmetry centering around the core region.

15. The optical fiber according to claim 14, wherein a diameter of each of the holes is equal to or larger than 1.0 micrometer and equal to or smaller than 3.0 micrometers.

16. The optical fiber according to claim 14, wherein a distance between the core region and each of the holes is 0.1 micrometer to 1.1 micrometers.

17. The optical fiber according to claim 16, wherein the distance between the core region and each of the holes is equal to or smaller than 0.9 micrometer.

18. The optical fiber according to claim 17, wherein the distance between the core region and each of the holes is equal to or smaller than 0.6 micrometer.

19. An optical device comprising:
a light source that outputs a light;
an optical input unit that receives the light from the light source;
an optical fiber that causes a nonlinear optical phenomenon to occur by the light from the optical input unit; and
an optical output unit that outputs a light generated by the nonlinear optical phenomenon in the optical fiber, wherein
the optical fiber includes
a core region through which a light propagates, and
a cladding region formed on an outer circumference of the core region, the cladding region including a plurality of holes arranged around the core region and having a refractive index lower than a refractive index of the core region,
a zero dispersion wavelength of the optical fiber is shorter than 1150 nanometers,
the optical fiber propagates a light having a wavelength longer than 1000 nanometers exclusively in a fundamental mode of $LP_{01}$ mode, and
an effective core area of the optical fiber is equal to or smaller than 12.0 $\mu m^2$ at a wavelength of 1064 nanometers.

* * * * *